(12) United States Patent
Treider et al.

(10) Patent No.: US 7,082,412 B1
(45) Date of Patent: Jul. 25, 2006

(54) ELECTRONIC FACTORING

(75) Inventors: Kevin C. Treider, Las Vegas, NV (US); Julie M. Borges, Las Vegas, NV (US)

(73) Assignee: eNet 30, Inc., Las Vegas, NV (US)

( * ) Notice: Subject to any disclaimer, the term of this patent is extended or adjusted under 35 U.S.C. 154(b) by 0 days.

(21) Appl. No.: 09/447,524

(22) Filed: Nov. 23, 1999

Related U.S. Application Data

(60) Provisional application No. 60/113,144, filed on Dec. 17, 1998, provisional application No. 60/109,600, filed on Nov. 23, 1998.

(51) Int. Cl.
*G06F 17/60* (2006.01)

(52) U.S. Cl. .......................... 705/38; 705/28; 705/35; 705/37; 705/39; 705/40; 705/41

(58) Field of Classification Search ............ 705/30–31, 705/33, 35–45
See application file for complete search history.

(56) References Cited

U.S. PATENT DOCUMENTS

| | | | |
|---|---|---|---|
| 4,799,156 A | 1/1989 | Shavit et al. | |
| 5,689,651 A | 11/1997 | Lozman | |
| 5,694,552 A | 12/1997 | Aharoni | |
| 5,704,044 A * | 12/1997 | Tarter et al. | 705/4 |
| 5,704,045 A | 12/1997 | King et al. | |
| 5,732,400 A * | 3/1998 | Mandler et al. | 705/26 |
| 5,924,083 A | 7/1999 | Silverman et al. | |
| 6,016,482 A | 1/2000 | Molinari et al. | |
| 6,029,149 A | 2/2000 | Dykstra et al. | |
| 6,052,674 A | 4/2000 | Zervides et al. | |
| 6,073,104 A * | 6/2000 | Field | 705/1 |
| 6,167,385 A * | 12/2000 | Hartley-Urquhart | 705/35 |

FOREIGN PATENT DOCUMENTS

AU   B-56325/98   *   5/1998

OTHER PUBLICATIONS

Pharmacy Fund, Jul. 15, 1996, New York (Business Wire), both pages enclosed.*
Steven Marlin, Crestmark Bank Offers Factoring, Jul. 1998, Bank Systems & Technology, both pages enclosed.*
Internet, 21st Capital Corp., Apr. 29, 1999, all 7 pages enclosed.*
Internet, Capital Factors, Inc., Apr. 14, 1997, all 10 pages enclosed.*
Paul Carrubba, Principles of Banking, 1994, American Bankers Association, all 3 pages enclosed.*
Paul Carrubba, Principas of Banking, 1994, American Bankers Association, three pages.*

(Continued)

*Primary Examiner*—David Vincent
(74) *Attorney, Agent, or Firm*—Knobbe, Martens, Olson & Bear, LLP

(57) ABSTRACT

The present invention is a method and system for electronic factoring. An electronic platform is provided for guaranteeing payment of receivables. Information from users is input into a profile database upon the electronic platform and is accessible by all users. The buyers are assigned a credit limit and are able to purchase from vendors within that credit limit. The payments for these purchases are guaranteed by a guaranteeing financial institution with is aligned with the platform.

12 Claims, 26 Drawing Sheets

OTHER PUBLICATIONS

Block, et al., "Foundations of Financial Management", 8th Edition Chicago, Irwin, 1997, pp. 213-214.

Bridgland, "International Factoring", Credit Control, Jul. 1992, vol. 13, No. 7, pp. 23-27.

Copy of International Search Report, International Application No. PCTUS99/28076, Filed Nov. 23, 1999.

Imhoff, "asset Securitization: Economic Effects and Accounting Issues", Accounting Horizons, Mar. 1992, vol. 6, No. 1, pp. 5-16.

Long, et al., "Trade Credit, Quality Quarentees, and Product Marketability", Financial Management, Winter 1993, vol. 22, No. 4, pp. 117-127.

Snyder, "The Withering of Wholesale, Collections & Credit Risk", May 1997.

Tannous, et al., "Blanks and Small Business Export Finance: New Targets for Services and Marketing Strategies", International Journal of Bank Marketing. 1993, vol. 11, No. 2, pp. 10-17.

\* cited by examiner

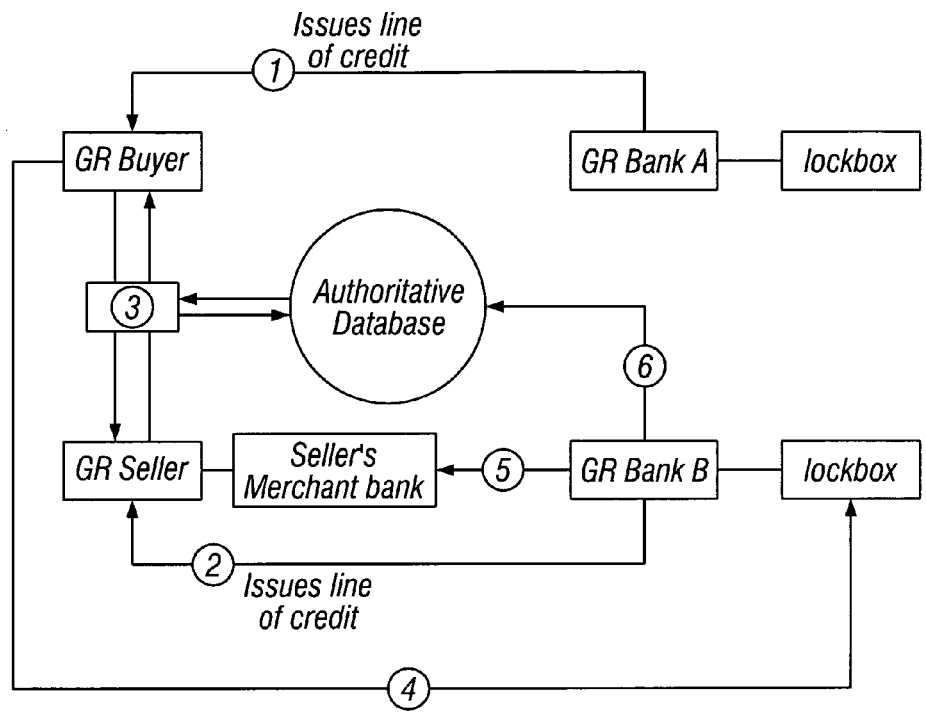

1. Bank A issues line of credit to buyer and guarantees receivables.
2. Bank B issues line of credit to seller and guarantees receivables.
3. Buyer makes purchase from Seller available credit checked and approved/denied.
4. Buyer makes payment tinto lockbox of Bank B
5. Bank B makes payment to Seller's Merchant bank
6. Bank B updates Authoritative Database of payment and available credit limit is adjusted.

*FIG. 22*

```
┌─────────────────────────────────────────────────────────────┐
│ ☐ ═══════════════  Approval Screen  ═══════════════════  ▣ ⊟│
│ ▽ ⇦      ⇨      ⟲      ⌂      ⊕      ⊹      ☐      🖨     🔓     ⊗   N│
│   Back  Forward Reload  Home  Search Guide  Images  Print Security Stop│
│ ▽ Netsite: [  ] [                                              ]│
│                                                                 │
│      ProfitScape                                                │
│      ─────────────────────────────────────────────────────────  │
│   ┌──────────────┐ YOUR COMPANY INTERNATIONAL                   │
│   │ GUARANTEE YOUR│ 25448 Costanza Blvd. Suite 800              │
│   │  RECEIVABLES │ Chicago, IL 65330                            │
│   ├──────────────┤ ──────────────────────────────────────────── │
│   │ENTER YOUR USER ID│ Enter Card Number, Expiration date and Amount below then "VERIFY"│
│   │ **********   │                                              │
│   │①ENTER PASSWORD│ Net30 Card Number  Expiration Date  Amount         Purchase Order (optional)│
│   │ **********   │ [6526-7166-9170]   [06/2003]   [$ 4300.00]        [PO 8996492]│
│   │  ( ENTER )   │                                       ② (VERIFY)  │
│   ├──────────────┤                                                   │
│   │  RETAIL WEB  │ Company           Card Number       Amount   PO#  │
│   │    STORES    │ PHILLYBUSTER DESIGNS  PS 6526-7166-9170  $ 4300.00  8996492│
│   ├──────────────┤ 167 Darth Drive      exp.06/2003                  │
│   │ WHOLESALE WEB│ Wallawalla WA 38115                      (EDIT)   │
│   │    STORES    │ JACKSON-HILL          PS 9926-5846-3496  $ 6,766.00│
│   ├──────────────┤ 9534 Bilster Ave.     exp.08/2002                 │
│   │    LIST      │ Wallawalla WI 55143                     (EDIT)    │
│   │ ALPHABETICALLY│ GRAVITON SYSTEMS     PS 9354-3352-1774  $12,800.00  44131│
│   └──────────────┘ 4441 Beanieprop Blvd. exp.12/2003              │
│                    Wallawalla AL 57662                   (EDIT)   │
│                    SUZIE'S BOUTIQUE      PS 6526-7116-9170  $ 500.00│
│                    5813 Mall Ridge       exp.06/2003              │
│                    Wallawalla AZ 38115                   (EDIT)   │
│                    When finished click on "Please Approve" for Approval Codes   (PLEASE │
│                    on the selected orders above               ③ APPROVE)│
│                                                                 │
│                              To edit records enter           ④  │
│                                 Company Name [           ]       │
│                              or Approval Code [PS74355   ]  (SEARCH)│
│                                                                 │
│ 🔒 [http://135.145.16.61.80/market/index.htm         ]   ⌸ ⌸ ⌸  │
└─────────────────────────────────────────────────────────────────┘
```

FIG. 25

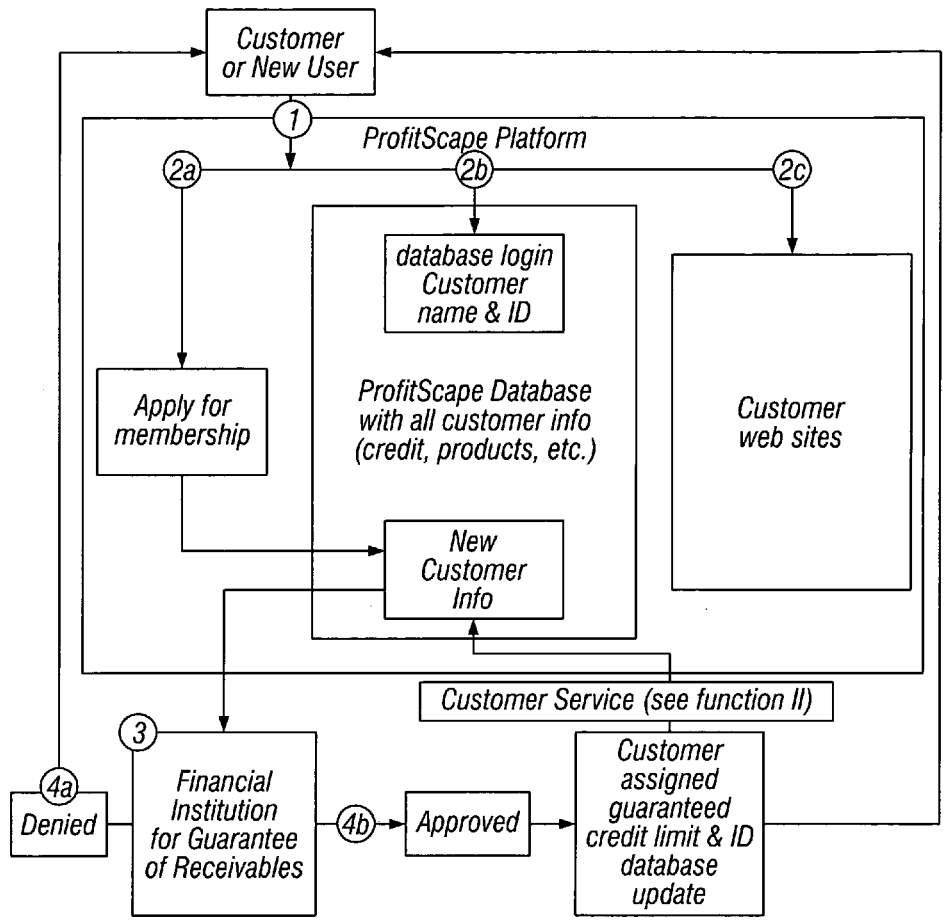

1. Existing Customer or New User visits ProfitScape web site
2a. New User Applies for membership and line of credit with guaranteed receivables
2b. Existing Customer logs in with user name and password
2c. Existing Customer or New User goes to ProfitScape Platform Web site
3. Application for credit and guarantee forwarded to financial institution for review.
4a. Application for credit denied-Customer notified
4b. Application for credit approved-Customer assigned guaranteed credit limit and ID and entered into database

FIG. 28

ELECTRONIC FACTORING

CROSS-REFERENCE TO RELATED APPLICATIONS

This application claims the benefit of the filing of U.S. Provisional Patent Application Ser. No. 60/109,600, entitled "Profitscape Software," filed on Nov. 23, 1998, and the specification thereof is incorporated herein by reference. This application also claims the benefit of the filing of U.S. Provisional Patent Application Ser. No. 60/113,144, entitled "Purchase Transaction Fulfillment Database," filed on Dec. 17, 1998, and the specification thereof is also incorporated herein by reference.

BACKGROUND OF THE INVENTION

1. Field of the Invention (Technical Field)

The present invention relates to the field of electronic commerce.

2. Background Art

Factoring includes buying and selling accounts receivable and credit insuring. Accounts receivable are purchased based upon the assumption that the accounts receivable are valid and collectable. Accounts receivable are sold in order to quickly obtain cash for cash flow purposes, rather than to retain them as receivable. Accounts receivable are also frequently used to borrow money upon, in order to finance other unrelated transactions. Factoring also includes credit insuring which occurs when an entity insures payment of an account receivable for a vendor, so that if the buyer does not pay, the insurer will. With the recent rapid growth of information applications on the Internet, computer networks have the potential to establish a new kind of open market place for goods and services. Buyers and sellers increasingly want to use the Internet to conduct their business electronically. This new method of doing business is referred to as electronic commerce, or "e-commerce."

The timely and costly process of processing paper requests for transactions such as the buying and selling of accounts receivable, as well as goods and services, plagues business transactions. Furthermore, buyers and sellers must expend significant resources to make appropriate credit decisions regarding a transaction. In procurement transactions, it is customary for the transaction to involve some form of credit, such as "open account trade credit," provided by the seller generally at no charge to the buyer but for a set period of time, normally thirty days. Buyers generally do not explicitly pay for the receipt of open account trade credit, and consider this free credit part of the established buyer/seller relationship. Credit cards are also available for relatively small purchases and operate by having a financial institution issue the credit card, and a merchant bank provide the cardholder with a revolving line of credit that can be used to buy goods from sellers who accept the credit card. This allows the cardholder to pay for credit card purchases over a period of time at an interest rate set by the merchant bank.

Other types of credit are travel and entertainment cards, which unlike credit cards, are considered to be open-ended credit with payment in full due at the time of billing, and does not extend revolving credit to the buyer, or cardholder. Credit cards, travel, and entertainment cards provide a uniform level of risk assessment to the seller and the seller pays a pre-determined interchange fee regardless of the actual credit risk presented by the buyer.

Commercial transactions are evolving to include electronic communication of financial transactions. Advances in computer networks and communication systems now apply to processing purchase and credit transactions. An important application of new computer technology is electronic commerce, which includes using electronic networks as a marketplace for business and consumer transactions. Electronic commerce services can include electronic brokerages, distributorships or clearinghouses that facilitate trade with electronic interchange media, such as public networks, for example the Internet, or proprietary access networks.

Electronic commerce, however, does not currently offer financial services to sellers, such as payment and credit assessments of buyers, electronic factoring and credit insuring of transactions. This need is usually fulfilled by relying on traditional techniques of credit analysis and payment before a transaction can be completed.

Various patents discuss methods of performing e-commerce wherein buyers and sellers are connected, but none address the issue of electronic factoring and credit insurance. U.S. Pat. No. 4,992,940, to Dworkin, entitled "System and Method for Automated Selection of Equipment for Purchase Through Input of User Desired Specifications," discloses an automated system that assists the user in locating and purchasing goods and services sold by a variety of vendors. U.S. Pat. No. 5,732,400, to Mandler et al., entitled "System and Method for a Risk-Based Purchase of Goods," discloses a financial clearinghouse for receiving requests for goods or services from a buyer and making a real-time determination of a risk classification of the buyer using an online repository of credit information. U.S. Pat. No. 5,757,917, to Rose et al., entitled "Computerized Payment System for Purchasing Goods and Services on the Internet," discloses a computerized payment system that prequalifies and pays a buyer's order through a third party, but is not a guarantee-of-payment mechanism. U.S. Pat. No. 5,822,737, to Ogram, entitled "Financial Transaction System," discloses an automated payment system allowing a consumer to purchase goods or services over the Internet with a credit card that is verified before making the payment. U.S. Pat. No. 5,802,497, to Manasse, entitled "Method and Apparatus for Conducting Computerized Commerce," discloses the use of a broker, broker scrip, vendor scrip, and currency to sell parts and services and deliver to the consumer. U.S. Pat. No. 5,745,886, to Rosen, entitled "Trusted Agents for Open Distribution of Electronic Money," discloses using a customer trusted agent and merchant trusted agent and establishing a cryptographically secure session, and to provide electronic money purchase or sale information and an account credential to the merchant trusted agent. U.S. Pat. No. 5,557,518, also to Rosen, entitled "Trusted Agents for Open Electronic Commerce," also discloses the use of trusted agents, establishing a cryptographically secure session and electronically transferring funds in purchasing merchandise. U.S. Pat. No. 5,717,923, to Dedrick, entitled "Method and Apparatus for Dynamically Customizing Electronic Information to Individual End Users," discloses maintaining a personal profile database to store consumer information and a consent adapter to compare electronic information received by a client system to consumer information in the personal profile database.

U.S. Pat. No. 5,717,989, to Tozzoli et al., entitled "Full Service Trade System," discloses storing criteria specified by a funder relative to trade transactions for buyers and sellers and comparing the criteria with a proposed purchase order in order to determine whether the system can generate a payment guarantee on behalf of the funder for the buyer to the seller. U.S. Pat. No. 5,826,241, to Stein et al., entitled "Computerized System for Making Payments and Authenticating Transactions Over the Internet," discloses a payment system that provides cardholder accounts for first and second Internet users and making queries to the first user on whether to proceed with payment to the second user. U.S. Pat. No. 5,842,178, to Giovannoli, entitled "Computerized Quotation System and Method," discloses a computer-based communications network of members for processing requests for quotes for goods and services, as well as storage containing the identification of the members and means for transmitting and broadcasting requests for quotes. U.S. Pat. No. 5,694,551, to Doyle et al., entitled "Computer Integration Network for Channeling Customer Orders Through a Centralized Computer to Various Suppliers," discloses an electronic requisitioning system that channels customer orders to internal suppliers and outside vendors, and processes invoices. U.S. Pat. No. 5,671,280, to Rosen, entitled "System and Method for Commercial Payments Using Trusted Agents," discloses a system for electronic payment using a customer trusted agent and a merchant trusted agent. U.S. Pat. No. 5,664,115, to Fraser, entitled "Interactive Computer System to Match Buyers and Sellers of Real Estate, Businesses and Other Property Using the Internet," discloses automatically connecting sellers of property with potential buyers, preferably over the Internet, wherein the host system stores records regarding the properties and can be searched by potential buyers, and the system permits evaluation of potential buyers to screen them.

Various articles have been written which disclose forms of electronic payment methods, but these methodologies only relate to moving money around, from one account to another, electronically and do not address the present need in the marketplace for electronic factoring.

The present invention overcomes all of the limitations of the prior art and addresses the need for an electronic commerce version for factoring. The present invention enables buyers to purchase goods from vendors with a third party guarantee to the vendor via electronic factoring that guarantees the payment. By using the present invention, electronic factoring, including credit insurance, is performed in an efficient manner. The present invention enables buyers to obtain goods and services immediately without having to pay for them at the time of the transaction.

The present invention is a credit database set up for all users that assigns a credit limit to the customers for credit as well as a credit instrument for guarantee of payment to vendors. Payment is guaranteed through a banking partner, the guaranteeing financial institution, who guarantees all receivables that are created through the sales on the platform (entitled "ProfitScape" in the Figures) to ensure payment and security of the transaction. The system tracks and maintains a database that details credit dollar amounts available and account activity of each user. The present invention defines a credit-worthy marketplace that enables users, who become members, to purchase goods and services on credit based on their respective financial positions which have been evaluated by the guaranteeing financial institution.

SUMMARY OF THE INVENTION
(DISCLOSURE OF THE INVENTION)

The present invention is a method and system for electronic factoring. The method comprises the steps of providing an electronic platform for guaranteeing payment of receivables; inputting information from users into a profile database upon the electronic platform; assigning buyers a credit limit; and guaranteeing payment to vendors for users who purchase from the vendor. Additionally, the method comprises linking at least two users, the users being either buyers, vendors, international licensees, or financial institutions for guaranteeing payment via the platform. Guaranteeing payment to vendors preferably comprises aligning the platform with a guaranteeing financial institution. Aligning the platform with a guaranteeing financial institution preferably comprises aligning the platform with that institution in order to perform a factoring-type such as credit insuring, full-factoring, or lending. The electronic factoring method can further comprise the steps of producing a symbol to represent each user's profile and exchanging information between users via the symbol on the electronic platform. Guaranteeing payment to vendors can comprise electronically sending the vendor the user's symbol in order to show the vendor that payment is guaranteed by the platform. The method can further comprise the steps of electronically sending the user's symbol to the guaranteeing financial institution and sending a guarantee of compensation from the guaranteeing financial institution to the vendor. Guaranteeing payment to vendors can comprise the steps of issuing each user an identifying card showing membership on the platform; purchasing from the vendor with the identifying card; and accessing the user's credit availability via the platform with the identifying card.

Providing an electronic platform preferably comprises providing an Internet web site having the platform for users to access, and optionally comprises the step of providing Internet web site links for users to access other users' web sites. The step of inputting information from users into a profile database preferably comprises the steps of inputting data such as name, address, contact information, primary industry, credit insured amount, payment history, credit usage, target marketplace, products offered, services offered, inventory, buying trend data, and Internet usage data.

The electronic factoring method further can comprise the steps of verifying a user as a member of the platform and purchasing from the vendor. Purchasing from the vendor can comprise first searching the profile database with a search engine. Purchasing from the vendor preferably comprises purchasing from the vendor with a line of credit within the credit limit established by the profile database.

Guaranteeing payment to vendors can comprise the steps of reassigning the receivable to the guaranteeing financial institution; making payment to the platform; and forwarding payment from the platform to the vendor. Guaranteeing payment to vendors can alternatively comprise reassigning the receivable to the guaranteeing financial institution; making payment to the guaranteeing financial institution; and forwarding payment from the guaranteeing financial institution to the vendor. In yet another alternative embodiment, guaranteeing payment to vendors comprises accessing the platform directly by the vendor for verification of credit availability and forwarding payment to the vendor upon verification. In still another alternative embodiment, guaranteeing payment to vendors comprises accessing the guaranteeing financial institution directly by the vendor for verification of credit availability and forwarding payment to the vendor upon verification. Still another alternative embodiment of guaranteeing payment to vendors comprises accessing the platform for verification of credit availability; paying the guaranteeing financial institution for purchases; and forwarding payment from the guaranteeing financial institution to the platform and merchant bank so that the merchant bank can credit the vendor.

The electronic factoring method also can comprise the steps of maintaining user credit records on the platform and periodically reviewing credit records by the financial institution for buyer credit availability. Linking at least two users can comprise the steps of creating offers by the vendor; sending the offers to an offer database on the platform for storage; comparing the offer database with the user profiles in the profile database; creating a list of matching offers and user profiles; and offering users those offers that match the user's profile upon log-in.

The present invention is also a method of electronic factoring comprising the steps of assigning buyers a credit limit upon a guaranteeing platform; verifying the buyer's identification as a member of the guaranteeing platform; verifying the buyer's credit amount when the buyer attempts to make a purchase; subtracting the purchase amount from the buyer's available credit limit upon making a verified purchase; notifying the vendor of the purchase order; reassigning the receivable to a guaranteeing financial institution via the guaranteeing platform; billing the buyer for the purchase order; and forwarding payment to the vendor. Forwarding payment to the vendor optionally comprises forwarding payment to the vendor from either the buyer, the guaranteeing financial institution, or the guaranteeing platform.

The present invention is also an electronic factoring system for guaranteeing payment of receivables and comprises an electronic platform; a profile database upon the electronic platform for inputting information from users; means for assigning buyers a credit limit; and means for guaranteeing payment to vendors for users who purchase from the vendor. The electronic factoring system can additionally comprise means for linking at least two users wherein the users consist of buyers, vendors, international licensees, and financial institutions for guaranteeing payment via the platform. Means for guaranteeing payment to vendors preferably comprises means for aligning the platform with a guaranteeing financial institution, and wherein said means for aligning the platform with a guaranteeing financial institution comprises aligning with a guaranteeing financial institution so that that institution can perform factoring such as credit insuring, full-factoring, or lending. The electronic system can further comprises means for producing a symbol to represent each user's profile, and means for exchanging information between users via the symbol on the electronic platform. Means for guaranteeing payment to vendors can comprise means for electronically sending the vendor the user's symbol in order to show the vendor that payment is guaranteed by the platform. The system can alternatively further comprise means for electronically sending the user's symbol to the guaranteeing financial institution and means for sending a guarantee of compensation from the guaranteeing financial institution to the vendor. Means for guaranteeing payment to vendors can alternatively comprise an identifying card issued to each user showing membership on the platform; means for purchasing from the vendor with the identifying card; and means for accessing the user's credit availability via the platform with the identifying card.

The electronic platform of the electronic factoring system preferably comprises an Internet web site having the platform available for users to access. The Internet web site can further comprise links for users to access other users' web sites. The profile database of the electronic factoring system preferably comprises a profile database for inputting data from users. This data can consist of any of the following: name, address, contact information, primary industry, credit insured amount, payment history, credit usage, target marketplace, products offered, services offered, inventory, buying trend data, and internet usage data.

The electronic factoring system can further comprise means for verifying a user as a member of the platform and means for purchasing from the vendor. Means for purchasing from the vendor can comprise means for first searching the profile database with a search engine. Means for purchasing from the vendor preferably comprises means for purchasing from the vendor with a line of credit within the credit limit established by the profile database.

Means for guaranteeing payment to vendors can comprise means for reassigning the receivable to the guaranteeing financial institution; means for making payment to the platform; and means for forwarding payment from the platform to the vendor. Alternatively, means for guaranteeing payment to vendors comprises means for reassigning the receivable to the guaranteeing financial institution; means for making payment to the guaranteeing financial institution; and means for forwarding payment from the guaranteeing financial institution to the vendor. In still another alternative embodiment, means for guaranteeing payment to vendor comprises means for accessing the platform directly by the vendor for verification of credit availability and means for forwarding payment to the vendor upon verification. In still another alternative embodiment, the means for guaranteeing payment to vendors comprises means for accessing the guaranteeing financial institution directly by the vendor for verification of credit availability and means for forwarding payment to the vendor upon verification. In yet another alternative embodiment, the means for guaranteeing payment to vendors comprises means for accessing the platform for verification of credit availability; means for paying the guaranteeing financial institution for purchase; and means for forwarding payment from the guaranteeing financial institution to the platform and merchant bank so that the merchant bank can credit the vendor.

The electronic factoring system can further comprise means for maintaining user credit records on the platform and means for periodically reviewing credit records by the financial institution for buyer credit availability. Means for linking at least two users can comprise means for creating offers by the vendor; means for sending the offers to an offer database on the platform for storage; means for comparing the offer database with the user profiles in the profile database; means for creating a list of matching offers and user profiles; and means for offering users those offers that match the user's profile upon login.

The present invention is also an electronic factoring system for guaranteeing payment of receivables comprising means for assigning buyers a credit limit upon a guaranteeing platform; means for verifying the buyer's identification as a member of the guaranteeing platform; means for verifying the buyer's credit amount when the buyer attempts to make a purchase; means for subtracting the purchase amount from the buyer's available credit limit upon making a verified purchase; means for notifying the vendor of the purchase order; means for reassigning the receivable to a guaranteeing financial institution via the guaranteeing platform; means for billing the buyer for the purchase order; and means for forwarding payment to the vendor. Means for forwarding payment to the vendor can comprise means for forwarding payment to the vendor from either the buyer, the guaranteeing financial institution, or the guaranteeing platform.

A primary object of the present invention is to provide unique profiled information that is delivered through an electronic system using software agents that enable credit and/or a guarantee of compensation to vendors for buyers.

A primary advantage of the present invention is that a unique database profile is created incorporating specific sales and product information detailing what each user has to sell, terms, company history, unique product information, and the category of transaction, be it either a retail or wholesale target market.

Another advantage of the present invention is that it provides unique profiled information and open access to both buyers and vendors to find information and make purchases guaranteed for payment.

Yet another advantage of the present invention is that it enables users to find unique information that matches their targeted request and enables them to purchase and consummate transactions electronically.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 22 is a flow diagram of a first interaction with two guarantor banks;

FIG. 25 is an illustrative approval screen in a web page according to the invention prior to submission;

FIG. 28 is a top-level flow diagram of the preferred web site of the invention in conjunction with customer web sites.

DESCRIPTION OF THE PREFERRED EMBODIMENTS

Figure 1:
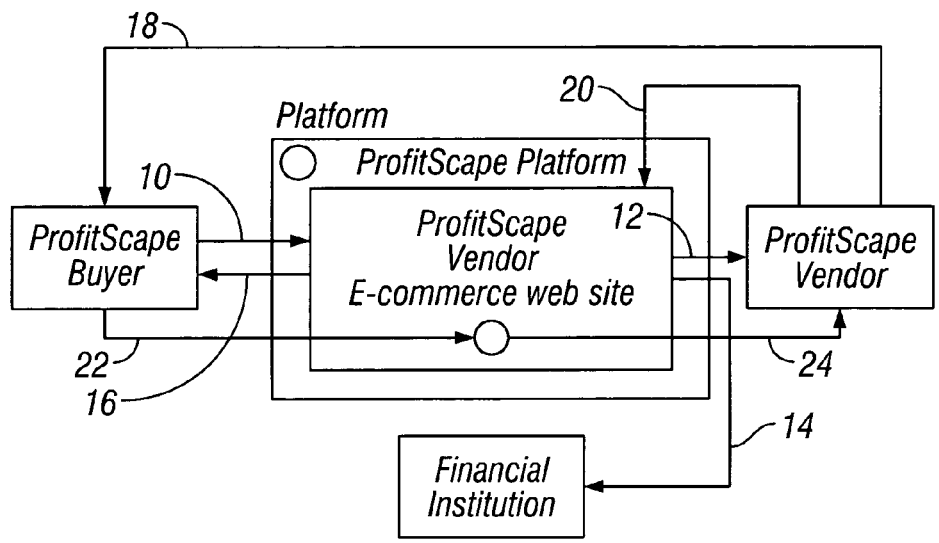
FIG. 1 is a block diagram of a first embodiment of the present invention showing the flow of purchase and fulfillment between buyer and vendor using the electronic commerce web site platform of the present invention.

Best Modes for Carrying Out the Invention

The present invention is a payment or credit arrangement process wherein payment of all transactions are guaranteed through a platform, and aligned guaranteeing financial institution (or guarantor bank). All users, whether buyers or sellers ("vendors") are put into a profile database that defines their credit amount, credit used, and credit available A unique number is then assigned to each user that will be used as an identifying symbol to be held in the electronic database. This symbol, or digital representation thereof, represents a profile enabling users to obtain and utilize credit to facilitate purchases of goods, services, and other intangibles through the system. The information and implementation of the present invention is preferably distributed electronically over data lines into a worldwide web platform to facilitate users' purchase transactions or vendors' sales needs.

The digitally produced symbol is delivered electronically via data lines to find targeted information, and enables the buyer to purchase goods, services, or other intangibles ordered through the system. A search engine is used to locate the required information over a network of profiled vendors. The same process operates in reverse to also link vendors to buyers. Information using software agents can be accessed electronically based on an Alchemy model that enables users to seek and match their specific requests. The unique symbol that is assigned for the vendor's profile, as well as a specific symbol representing the targeted audience of buyers, with additional symbols or digital representations for other information, allows for an efficient and easy-to-use exchange of information. Additionally, proprietary profiles can also be maintained to facilitate electronic commerce for users within the database to exchange information and to target specific information to a targeted audience.

Vendors benefit by reaching buyers through the system and offering credit to purchase their goods, services, or other intangibles. Competing advertising members can use the system to reach the attention of users who wish to seek information residing on the system as well. Vendors can use the credit system to sell to buyers within the profile database to ensure future payment of goods that are sold on a time-delay process unique to each of the profiled users.

Vendors use the system to transmit and record their requests for compensation. Buyers are then able to guarantee their request to deliver compensation by using the digitally produced symbol, or symbols, that are activated by an icon. The requests are processed through the electronic database of profiled information within the system.

By electronically transmitting the symbol, the user can deliver a promise of compensation to be paid immediately, or in the future. By using software agents, the electronic database transmits digital information electronically to those users who are seeking to receive compensation in exchange for releasing the requested items that the user/buyer has requested. The digitally produced symbol simultaneously instructs a third party to deliver a guarantee of compensation on behalf of each user. The third party guarantees compensation to the vendor in the form of either credit insuring, full-factoring, or lending based upon accounts receivable.

Attention is now directed to the figures. FIG. 1 is a flow diagram of a first embodiment of the present invention showing the purchase and fulfillment between a buyer, vendor, and guaranteeing financial institution using the method of the present invention. Referring to FIG. 1, the buyer makes a purchase from the vendor with a guaranteed credit line as established in the profile database 10. The purchase order is then being forwarded to the vendor for fulfillment 12. Then the receivable is re-assigned to the guaranteeing financial institution for a guarantee of the receivables 14, the purchase order is returned to the buyer for the buyer's records 16. The vendor ships the order with a copy of the invoice and terms back to the buyer 18, for example, net 30, net 60, or net 90. Then the vendor sends shipment confirmation and a copy of the invoice to the platform for the present invention, entitled "ProfitScape" (hereinafter referred to as the platform), on an e-commerce web site 20. Next the buyer makes payment to the platform based upon the vendor terms 22, and the platform forwards payment to the vendor 24, minus a negotiated percentage. The platform profile database maintains credit records and transfers all monies from the buyer to the vendor minus a negotiated percentage or transaction fee, for example 8–12% of the transaction. The guaranteeing financial institution will review the accounts periodically, for example every 90 days, for buyer credit line limits. Also periodically, for example every 30 days, the platform reconciles with the guaranteeing financial institution for a percentage of all gross revenue of the platform's guaranteed electronic commerce transactions.

Figure 2:
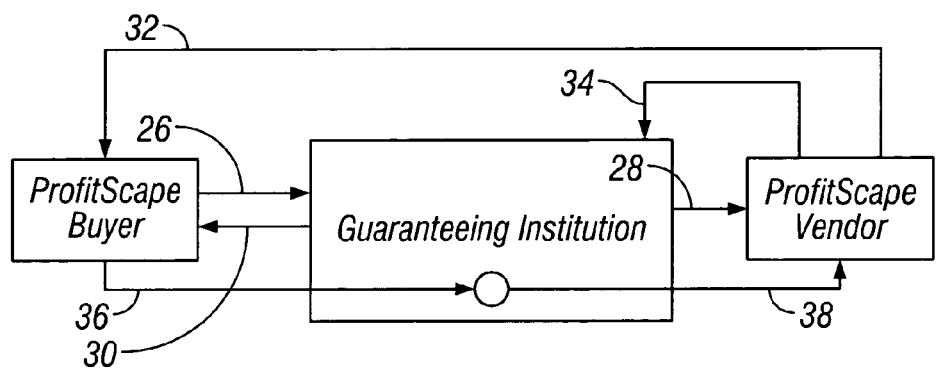
FIG. 2 is a block diagram of a second embodiment of the present invention wherein the buyer makes payment directly to the guaranteeing institution.

FIG. 2 is a second embodiment of the present invention and is similar to that of FIG. 1. In FIG. 2, the buyer makes a purchase through the guaranteeing financial institution with a guaranteed credit line 26. The purchase order is then forwarded to the vendor for fulfillment 28 and the purchase order is then returned to the buyer for the buyer's records 30. Then the vendor ships the order with a copy of the invoice and terms to the buyer 32, and the vendor sends shipment confirmation and a copy of the invoice to the guaranteeing financial institution 34. Next the buyer making payment to the guaranteeing institution based upon the vendor's terms 36 and the institution forwarding payment to the vendor minus the institution's negotiated percentage 38.

Figure 3:
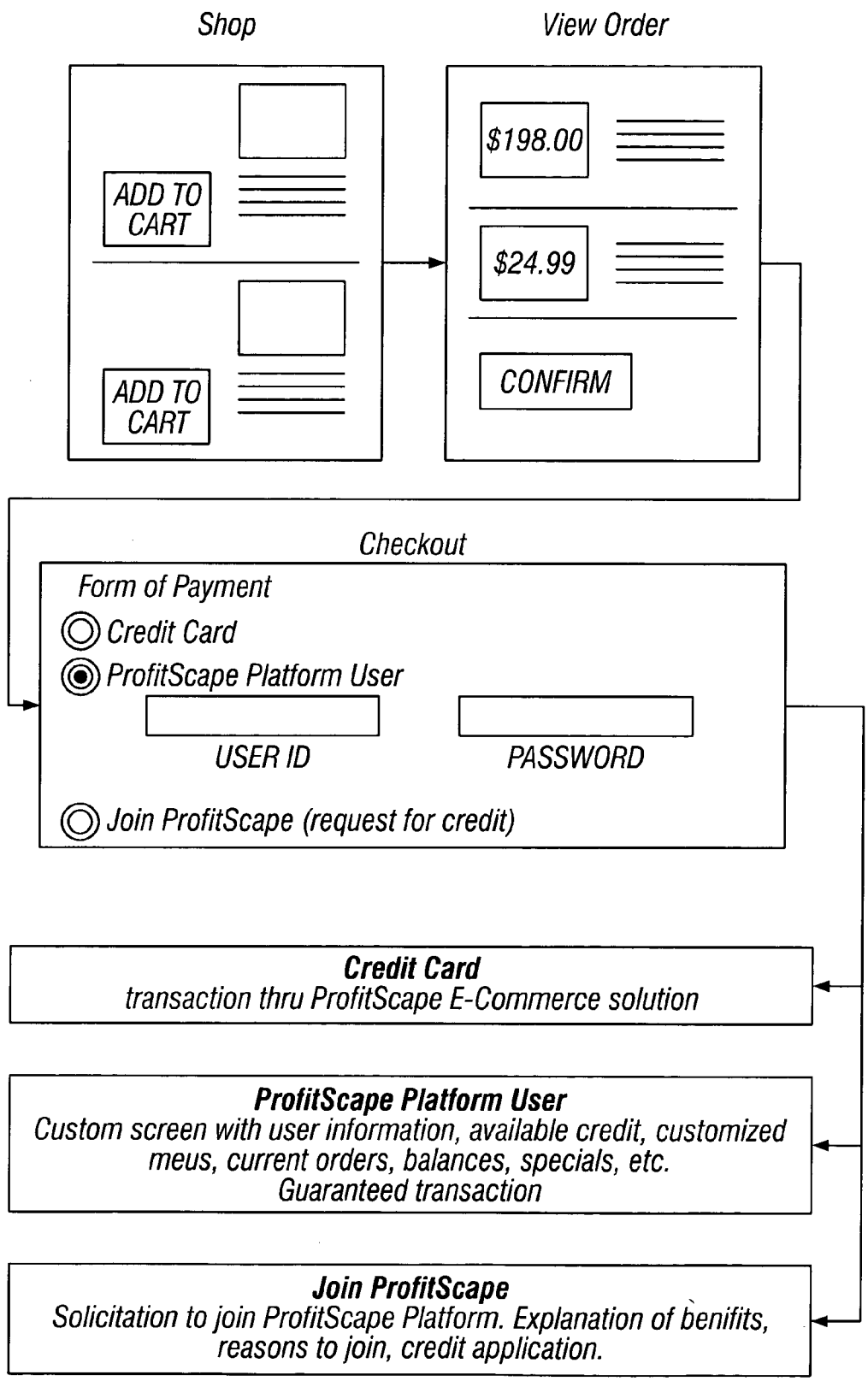
FIG. 3 is a block diagram of the post-shopping experience for a user of the present invention.

FIG. 3 is a block diagram demonstrating the post-shopping experience of the buyer using the methodology of the present invention. The user first shops and then views their order, and before checking out, chooses a form of payment, be it either a credit card, or through the platform of the present invention. If a credit card is chosen as the method of payment, the transaction proceeds through the platform of the present invention. If the user is enrolled in the platform of the present invention, their transaction is guaranteed. The user is also offered the choice of joining and becoming a member of the platform.

Figure 4:
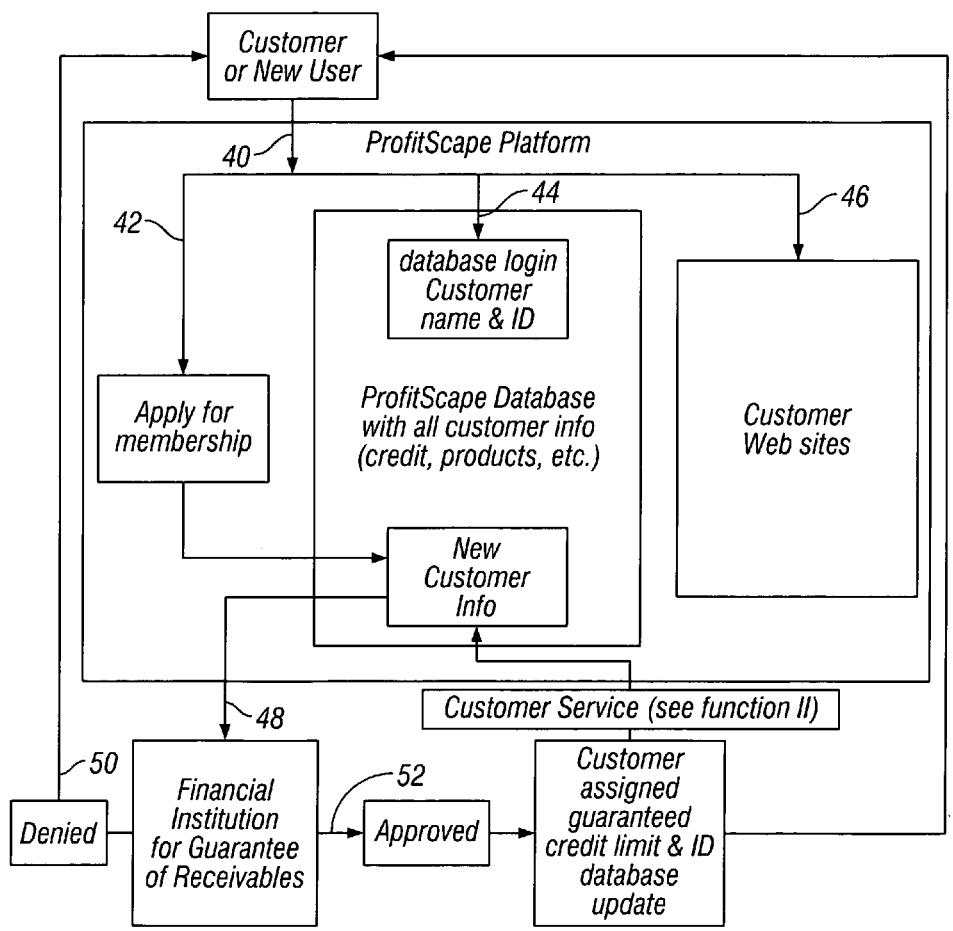
FIG. 4 is a block diagram of the functions that an existing customer or new user proceeds through when visiting the web site platform of the present invention.

FIG. 4 shows the process that a user proceeds through when first logging on to the platform of the present invention. First the existing customer or the new user visits the web site having the platform of the present invention 40. The new user applies for membership and a line of credit with guaranteed receivables 42. An existing user is shown logging in with their user name and password 44, and the existing customer or new user is forwarded to the appropriate web sites for purchases 46. Applications for credit and guarantees are forwarded to the financial institution for review 48. If the application for credit has been denied, the customer is then notified 50. If the application for credit has been approved, the customer is assigned a guaranteed credit limit 52, as well as an "ID" and is then entered into the user profile database.

Figure 5:
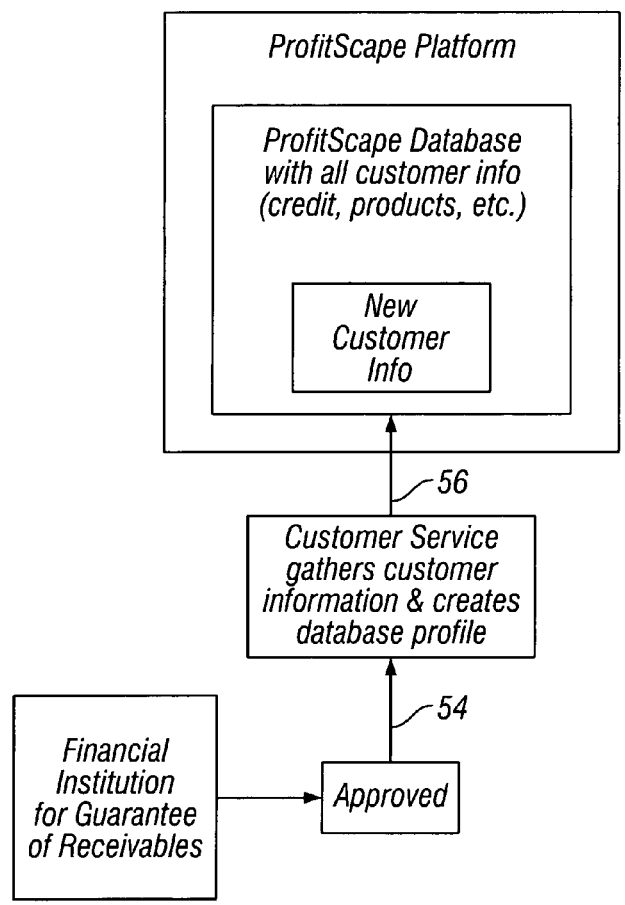
FIG. 5 is a block diagram showing the functions that a user proceeds through with customer service.

FIG. 5 is a block diagram demonstrating an approved customer 54 being forwarded to customer service so that customer service can gather information 56 and create a user database profile on their company, products, target market, history, terms, etc. Example data collected for the user's profile includes: name, address, contact information, primary industry, credit insured amount, payment history, credit usage, target marketplace, products offered, services offered, inventory, buying trend data, and internet usage data.

Figure 6:
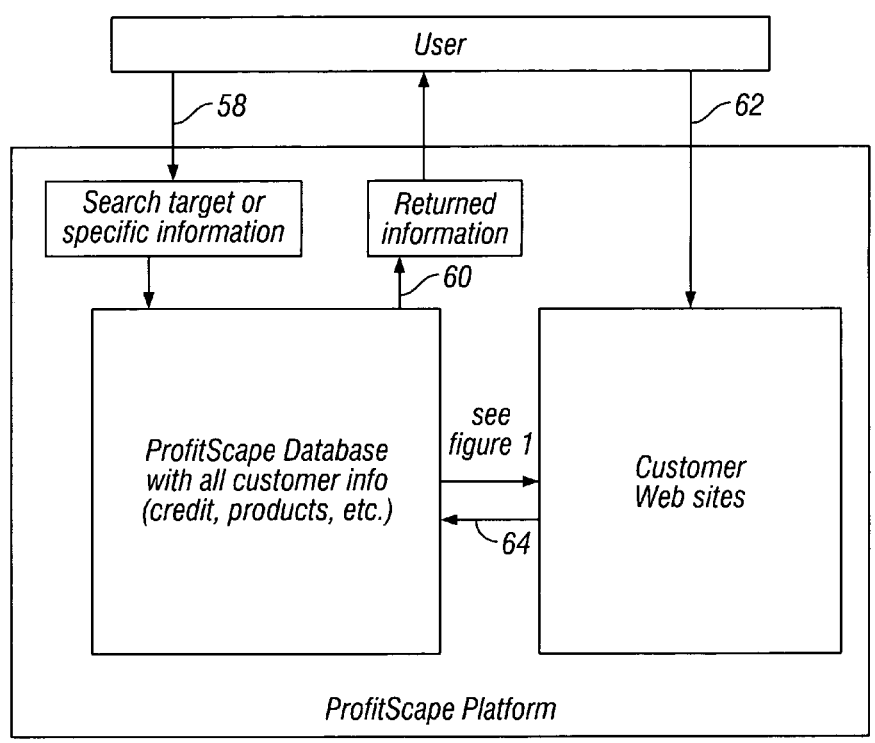
FIG. 6 is a block diagram showing a user searching the database of the present invention and consummating a transaction with a link to other web sites.
Figure 7A:
FIGS. 7a–7e demonstrate the algorithmic methods of communication for the various embodiments of the present invention.
Figure 7B:
Figure 7C:
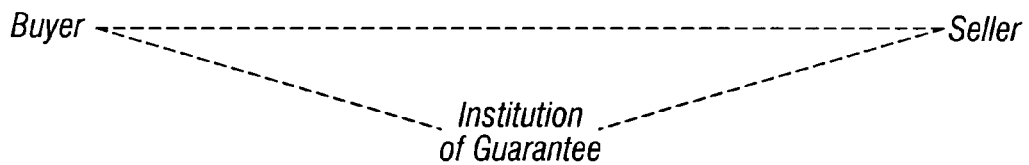
Figure 7D:
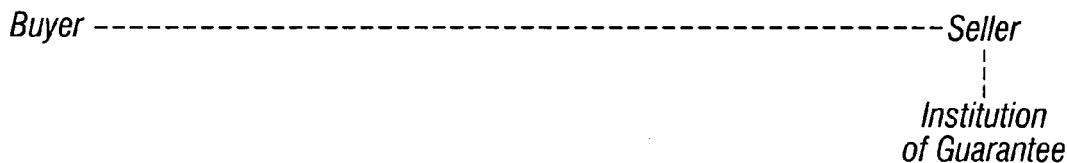
Figure 7E:
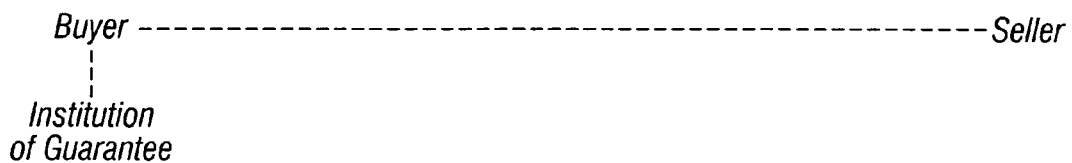

FIG. 6 is a block diagram demonstrating a user searching the profile database. A user queries the database through a search engine for specific information 58. Data is searched from the database and returned to the user 60. Then the user accesses a web site from a returned data link 62, and the user consummates an electronic commerce transaction 64 such as that shown in FIG. 1.

FIG. 7 shows the algorithmic methods for the various embodiments of the present invention. In FIG. 7a the buyer, seller, and guaranteeing institution cannot communicate with each other but only with the platform for the present invention. In FIG. 7b the buyer and seller only communicate with the guaranteeing institution and not with each other. In FIG. 7c the buyer, seller, and guaranteeing institution can all communicate directly with each other. In FIG. 7d the buyer and guaranteeing institution can each only communicate with the seller, but the seller can communicate with either or both of the buyer and guaranteeing institution. In FIG. 7e the seller and the guaranteeing institution can each only communicate with the buyer, but the buyer can communicate with either or both of them.

Figure 8:
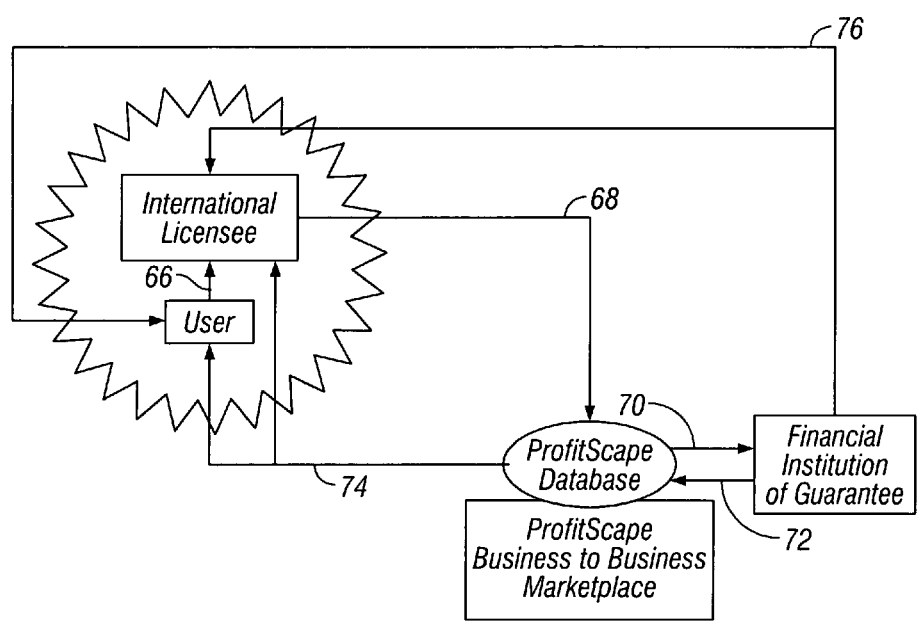
FIG. 8 is a flow diagram showing the first international licensee embodiment of the present invention in the first stage.
Figure 9:
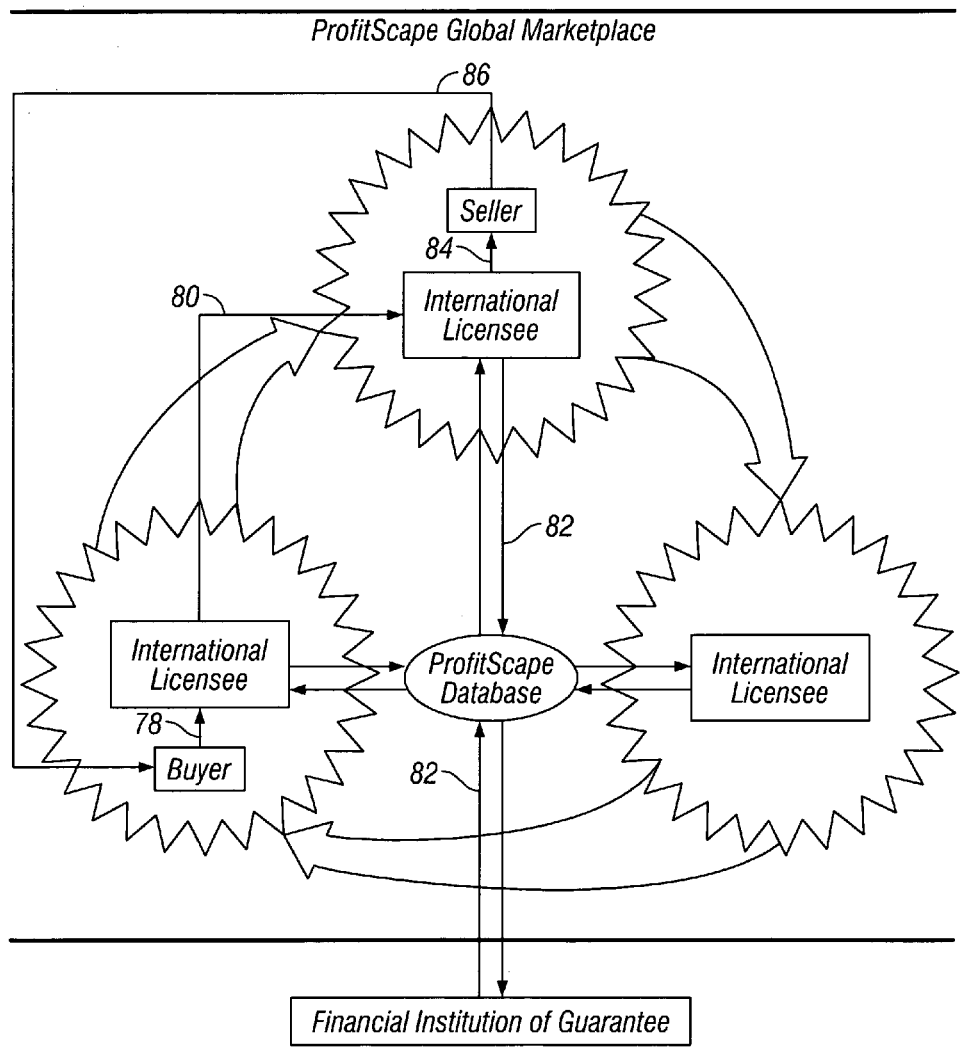
FIG. 9 is a flow diagram showing the first international licensee embodiment of the present invention in the second stage.

FIG. 8 shows a first embodiment flow diagram wherein the method of the present invention includes an international licensee. First a user applies for a credit line through the international licensee 66. Then an application is entered into the database of the present invention 68, and that application is forwarded to the guaranteeing financial institution 70. Then the applicant who is approved is assigned a line of credit and a user ID, and the database is then updated with their information 72. The user and licensee are then notified 74. At this point, the process proceeds as shown in FIG. 9. If the application is denied, the applicant and licensee are notified accordingly 76.

FIG. 9 demonstrates the process that proceeds after the applicant has been approved in FIG. 8.

The international buyer accesses the marketplace through a licensee 78. Then the platform's buyer makes an international purchase on the platform with the user's ID 80. Next the user ID and credit availability are checked through the database and the guaranteeing financial institution 82 and 82'. Then the seller receives the order with the guaranteed receivables 84, and the transaction has been completed and the order is shipped to the buyer 86.

Figure 10:
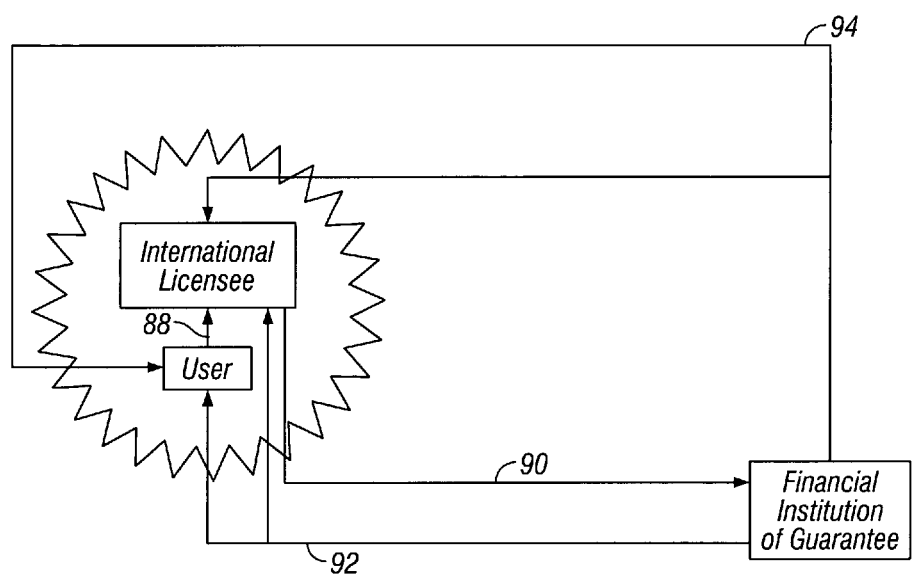
FIG. 10 is a flow diagram of a second international licensee embodiment of the present invention in the first stage wherein the financial institution of guarantee works directly with the international licensee.
Figure 11:
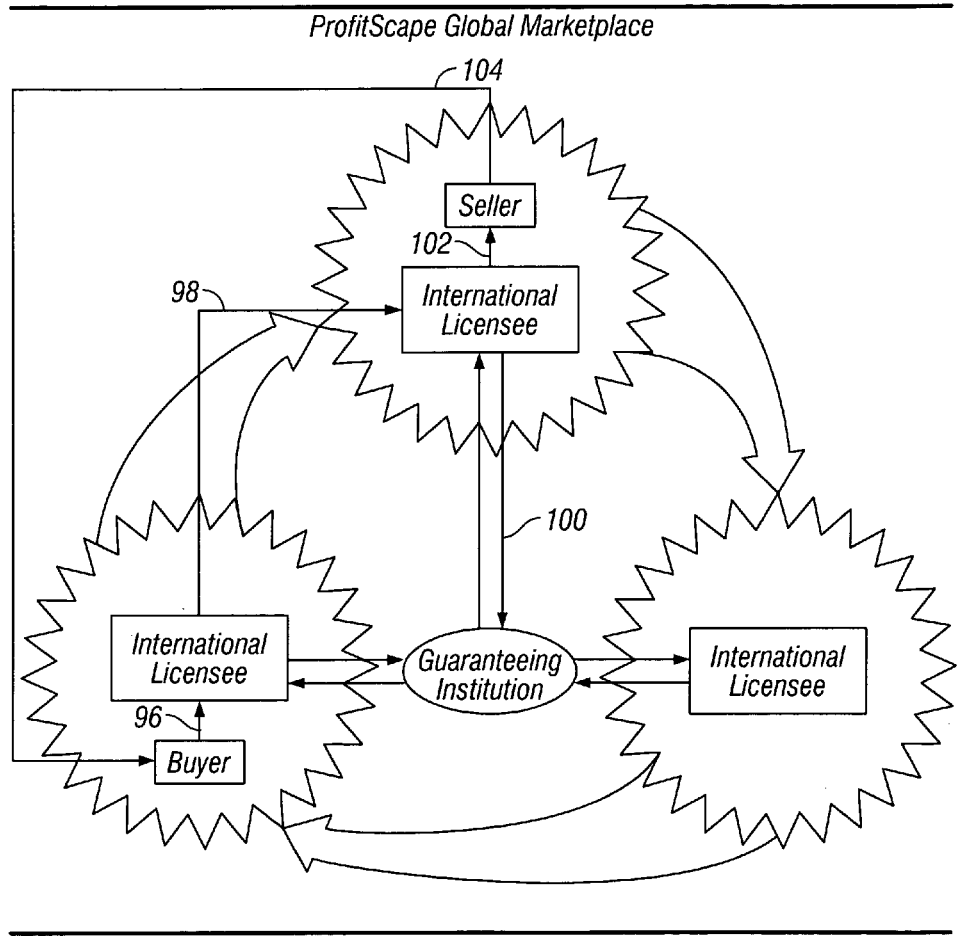
FIG. 11 is a flow diagram of a second international licensee embodiment of the present invention in the second stage.

FIG. 10 is a flow diagram for a second embodiment of the international licensee application of the present invention First the user applies for a credit line through an international licensee 88. Then the application is forwarded to the guaranteeing financial institution 90. If the application is approved, the applicant is then assigned a line of credit and a user ID 92. The user and licensee are then notified. At this point, the process proceeds as shown in FIG. 11. If the application is denied, the applicant and licensee are accordingly notified 94.

FIG. 11 represents the next stage in the process after having completed those steps in FIG. 10. In FIG. 11, the international buyer accesses the marketplace through a licensee 96 and the platform buyer makes an international purchase 98 on the platform of the present invention with the user ID. Then the user ID and credit availability are checked through the guaranteeing financial institution 100. The seller receives the order with the guaranteed receivables 102, the transaction is completed and the order is shipped to the buyer 104.

Figure 12:
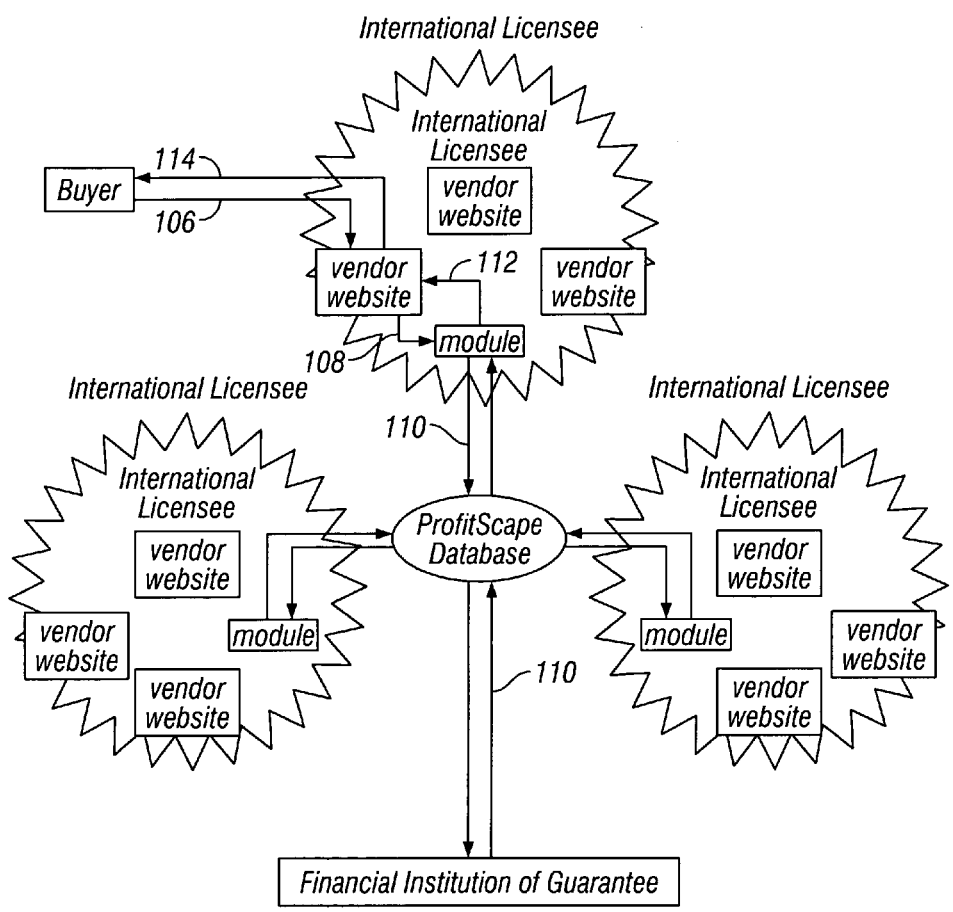
FIG. 12 is a third international licensee embodiment of the present invention.

FIG. 12 is a third embodiment of the international licensee application of the present invention. In FIG. 12, the guaranteed buyer makes a purchase from a vender on an international licensee platform 106. Then the user ID and password are passed to a module 108 which allows the communication with the database of the present invention, and the ID and credit availability are checked through the database, as well as the guaranteeing financial institution 110 and 110'. The vendor web site receives verification 112, and the transaction is completed and the order is then shipped to the buyer 114.

Figure 13:
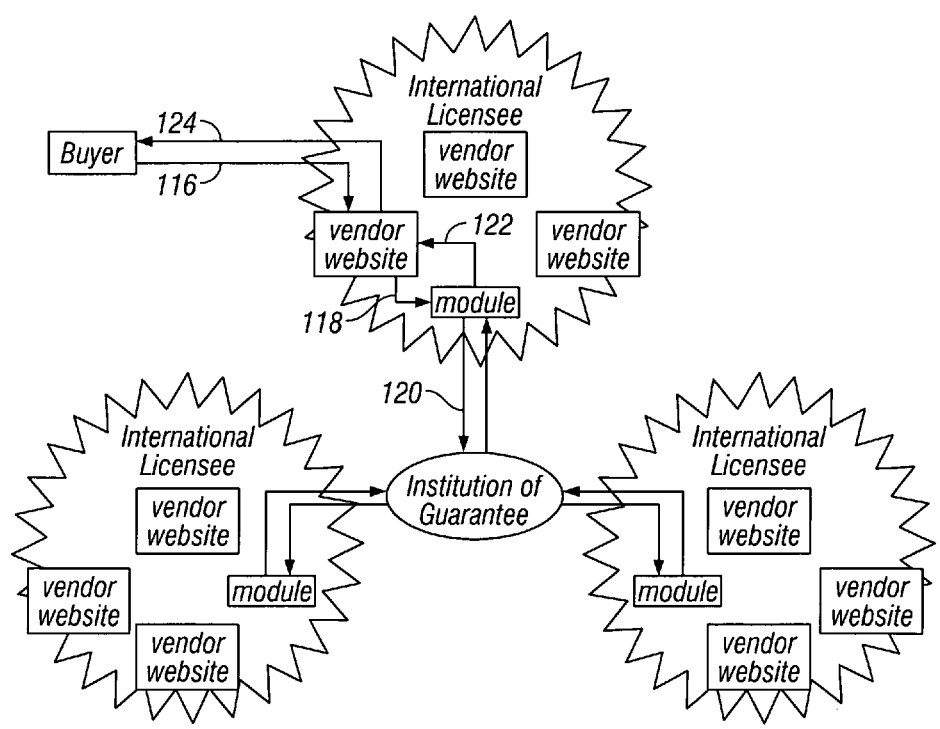
FIG. 13 is a fourth international licensee embodiment of the present invention.

FIG. 13 is a fourth embodiment of the international licensee application of the present invention wherein the communication occurs directly with the guaranteeing financial institution. First, the guaranteed buyer makes purchases from a vendor on the international licensee platform 116. Then the user ID and password are passed to a module which allows communication with the database of the present invention 118. Next the user ID and credit availability are checked through the guaranteeing financial institution 120. The vendor web site receives verification 122, and the transaction is completed and the order is then shipped to the buyer 124.

Figure 14:
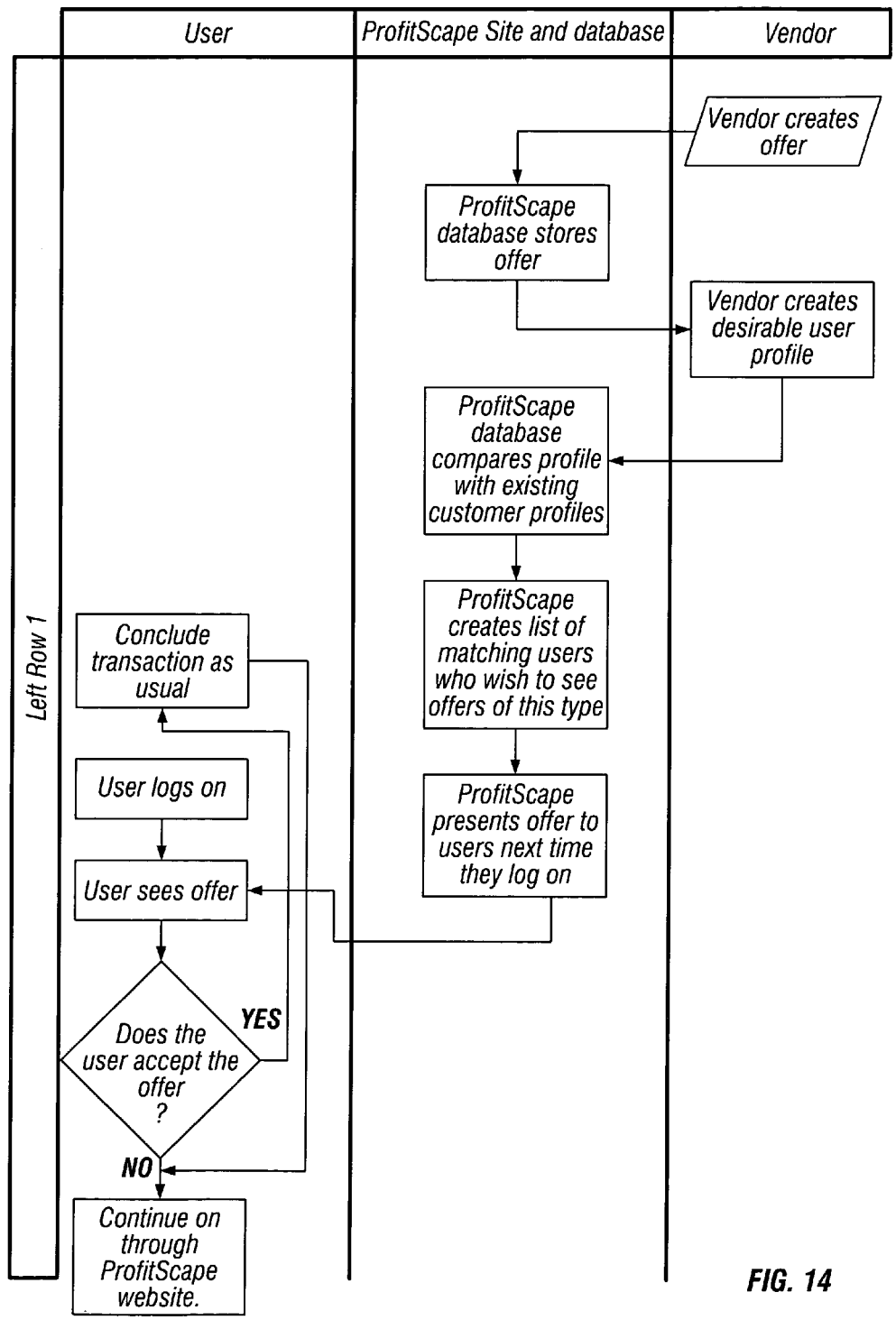
FIG. 14 is a flow chart showing the connection being made between user and vendor.

FIG. 14 is a flow chart demonstrating vendors' direct marketing to existing registered users (buyers) of the present invention. The buyer logs on and sees offers being presented from the database, and chooses whether or not to accept the offer. If the offer is accepted, the transaction is concluded. If the offer is not accepted, the user continues on through the web site. The vendor creates offers and then sends them to the database for storage. The vendor then creates a user profile from the information off of the database. The database then compares the profile created by the vendor with existing customer profiles. The present invention then creates a list of matching users who wish to see offers of this type and proceeds to offer them to those users the next time that they log on.

Figure 15:
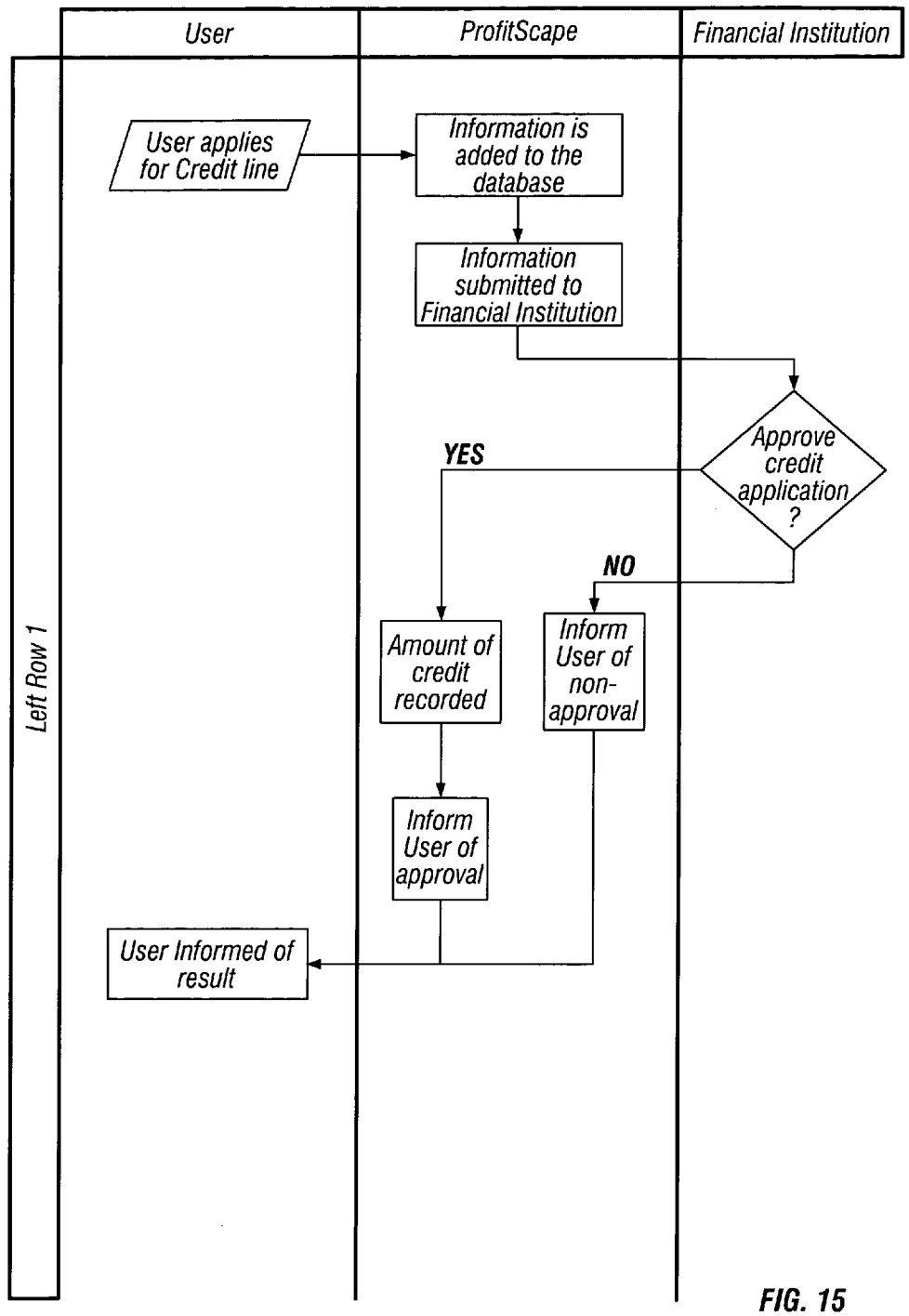
FIG. 15 is a flow chart showing the user application for credit.

FIG. 15 is a flow chart showing the user applying for credit with the methodology of the present invention. The user first applies for a credit line, and that information is then added to the database. The information is then submitted to a financial institution and the financial institution either approves or disapproves the credit application. If the application is not approved, the user is informed of the result. If the application is approved, the amount of credit is recorded for the user and the user is accordingly informed of approval and the amount of credit. For example, an applicant applies for a "net 30 card". This card is similar in appearance to a credit card. Should the applicant be approved for the net 30 card, then they will be able to purchase goods and services immediately, and upon receipt the guaranteeing institution or platform of the present invention will guarantee payment within thirty days to the vendor. The applicant can apply for the card either manually or electronically. Information received from the candidate is then entered into a database which is forwarded to a guaranteeing financial institution. The guaranteeing financial institution then reviews the application information and issues an insured line of credit if the applicant is approved. Once the applicant is approved, the guaranteeing financial institution notifies the platform of the insured credit line and guarantees payment of receivables. Then the net 30 card is issued to the applicant, who is now a registered user of the platform of the present invention. The user's transactions are then checked through the platform profile database for available credit and amounts adjusted. At the end of each day, the platform of the present invention keeps the guaranteeing financial institution updated on all user accounts' status. This methodology insures the vendor's receivables.

Figure 16:
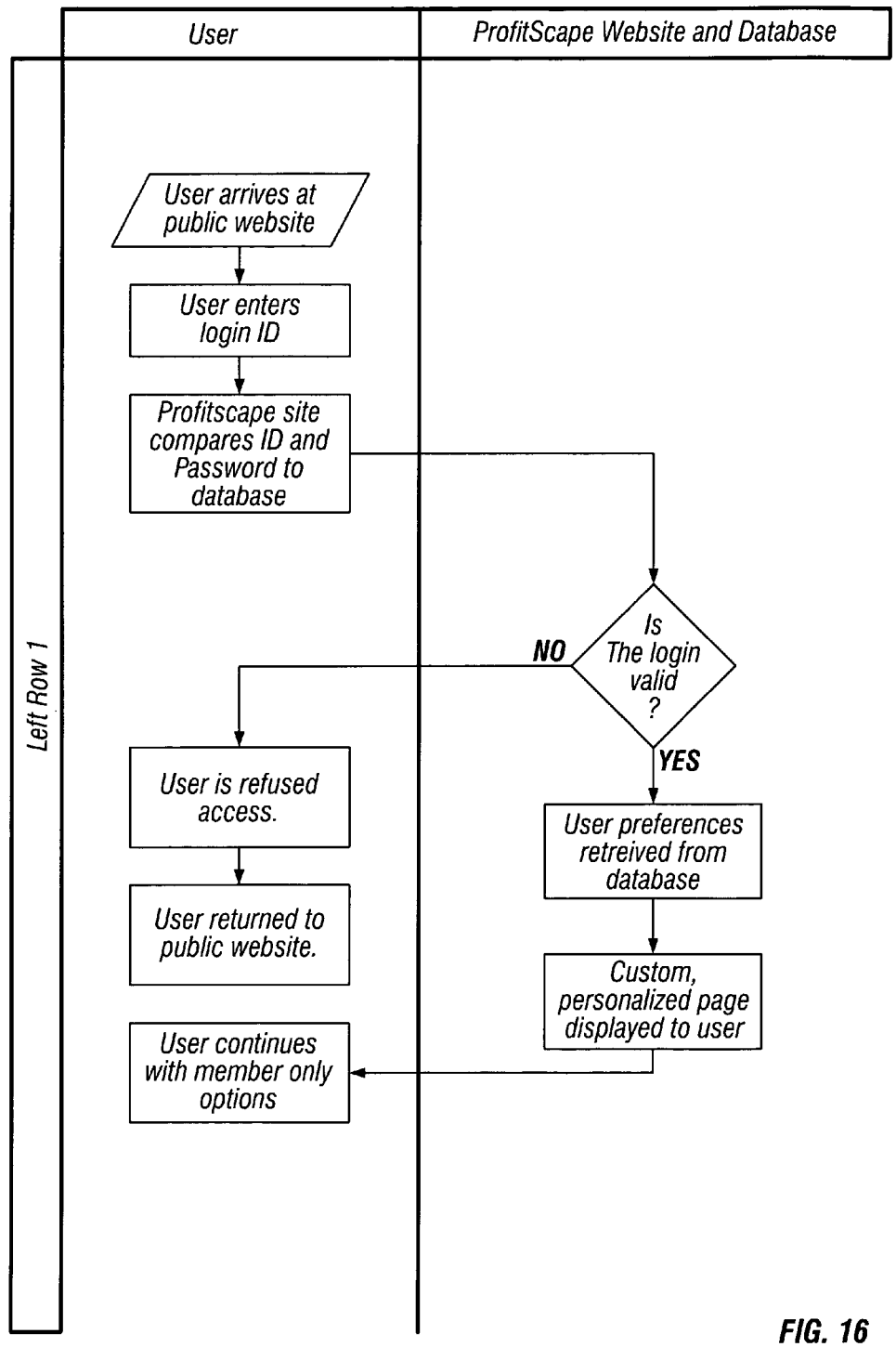
FIG. 16 is a flow chart showing the user log-in to the present invention.

FIG. 16 is a flow chart demonstrating the steps that a user proceeds through in logging on to the web site containing the platform of the present invention. The user first arrives at the public Web site and enters their login ID. The site then compares their ID and password to those recorded in the database. If the log-in is not valid, then the user is refused access and is returned to the public Web site. If the log-in is valid, then the user preferences are retrieved from the database and are customized to provide a personalized page displayed to the user. The user then continues with member-only options within the system.

Figure 17:
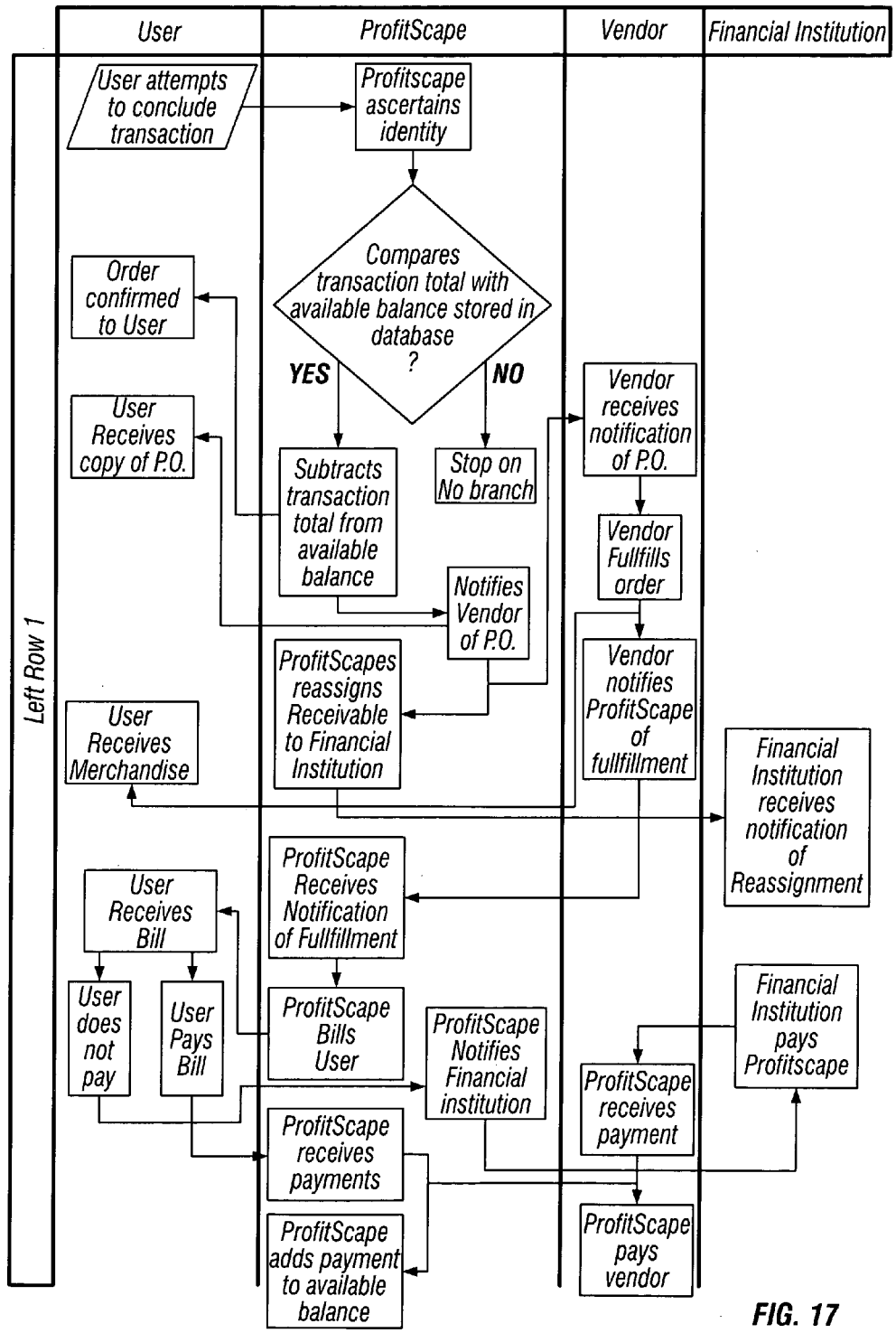
FIG. 17 is a flow chart showing the user making a purchase through the methodology of the present invention.

FIG. 17 is a flow chart demonstrating a user making a purchase using the methodology of the present invention. The user first attempts to conclude the transaction and the platform of the present invention ascertains the user's identity and compares their transaction with an available credit balance stored in the database. If their available balance is not adequate, then the transaction is denied. If the available balance is adequate, then the transaction proceeds and the present invention subtracts the transaction total from the available balance, and the order is confirmed to the user, the vendor is notified of the purchase order, and the user receives a copy of the purchase order. Next, the receivables are reassigned to the financial institution and the vendor receives notification of the purchase order and fulfills the purchase order. Once the receivables are reassigned to the financial institution, then the financial institution receives notification of that reassignment. Once the vendor notifies the platform of the fulfillment of the order and has sent the user the merchandise, the user is then billed. If the user does not pay the bill, then the financial institution is notified who then pays the platform who in turn pays the vendor. If the user does pay the bill, then their payment is added to the available credit in their account.

Figure 18:
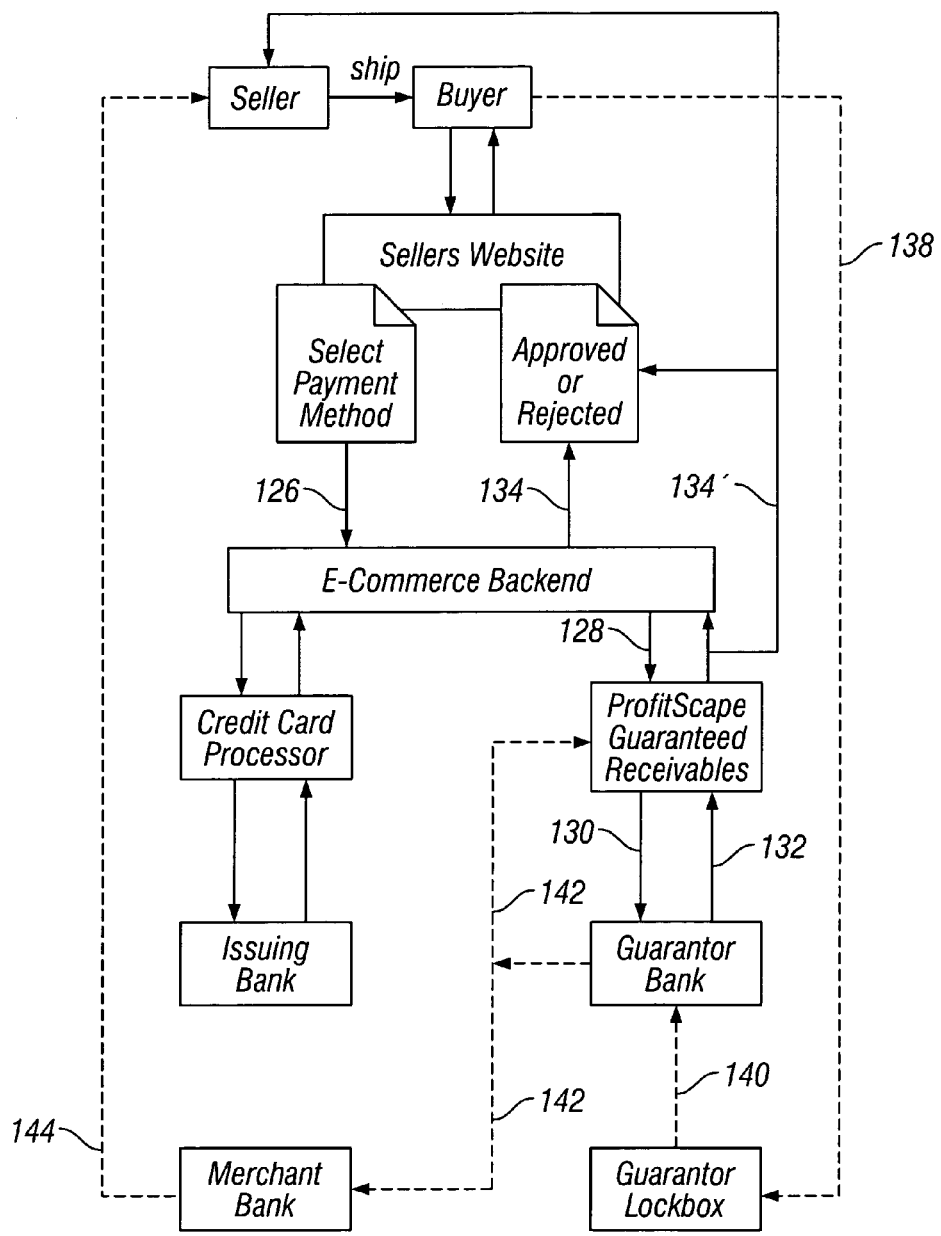
FIG. 18 is a flow diagram of an alternative embodiment of the present invention wherein both a guarantor bank and a merchant bank are used in the process.

FIG. 18 is a flow diagram of a third embodiment of the present invention. First the buyer selects the platform guaranteed receivables method as the method of payment 126. The e-commerce backend forwards purchase information to the platform profile database 128. Available credit is checked from the user's profile and new applicants are processed 130. Then the profile database is updated accordingly 132. The buyer is notified and if approved, the vendor, or seller, is also notified to ship 134 and 134'. Then the buyer makes payment to the guarantor bank according to the terms set forth by the vendor, or seller 138. The profile database is then updated accordingly 140. The guarantor bank processes the payment and forwards payment to the platform and merchant bank 142. Then the merchant bank credits the vendor, or seller 144.

Figure 19:
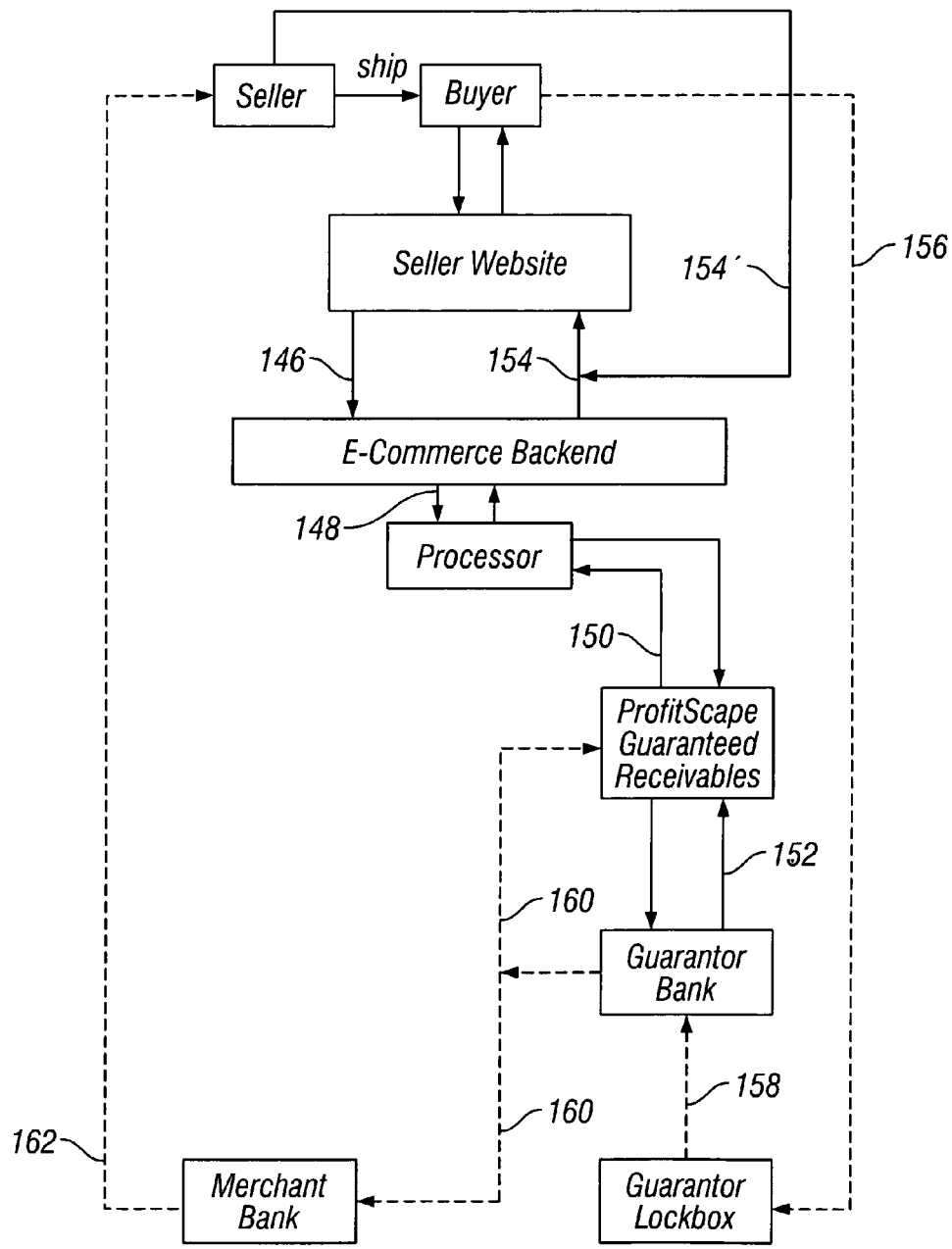
FIG. 19 is a flow diagram of another alternative embodiment of the present invention wherein both a guarantor bank and merchant bank are used.
Figure 20:
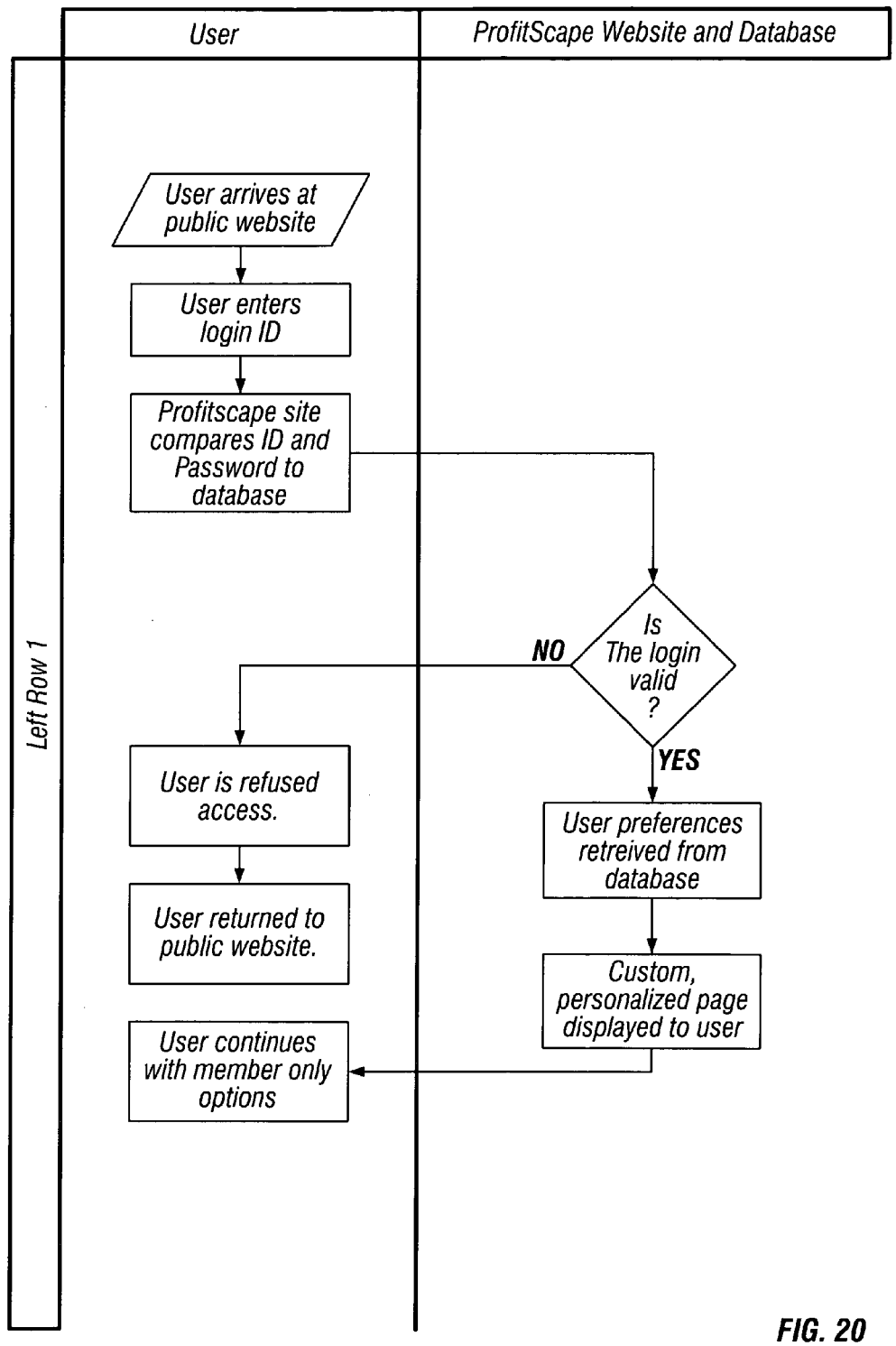
FIG. 20 is a flow diagram of the preferred user login to a web site according to the invention.
Figure 21:
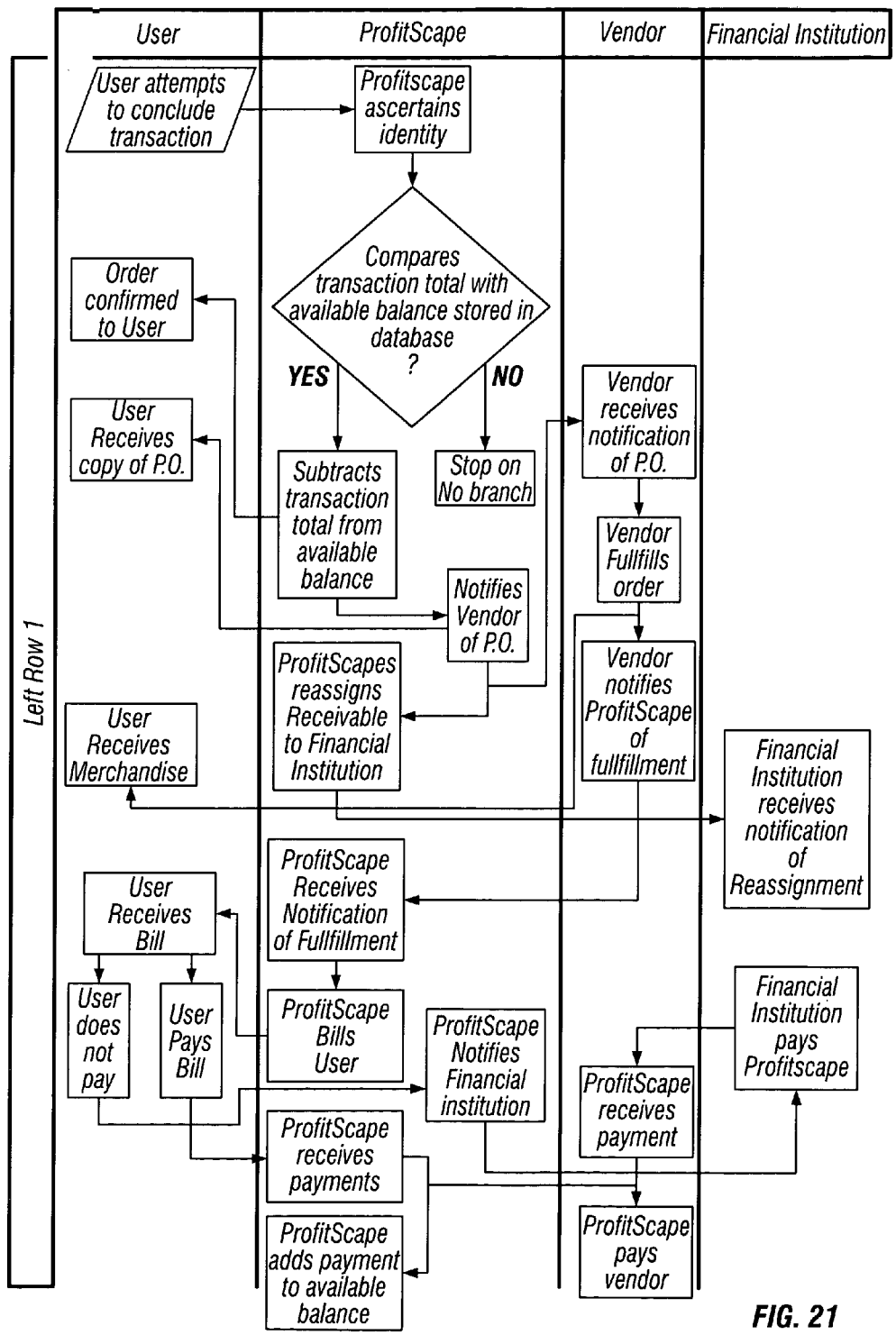
FIG. 21 is a flow diagram of the preferred purchase transaction according to the invention.
Figure 23:
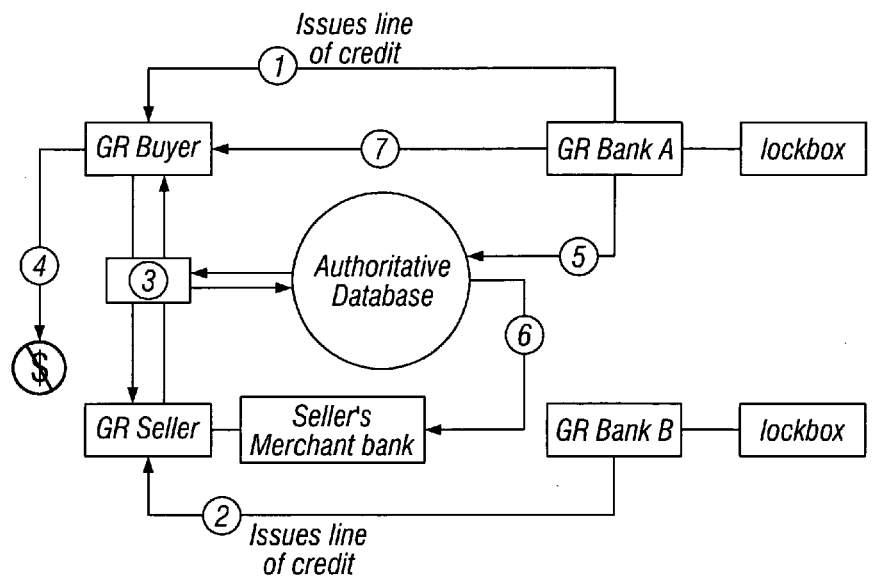
FIG. 23 is a flow diagram of a second interaction with two guarantor banks.
Figure 24:
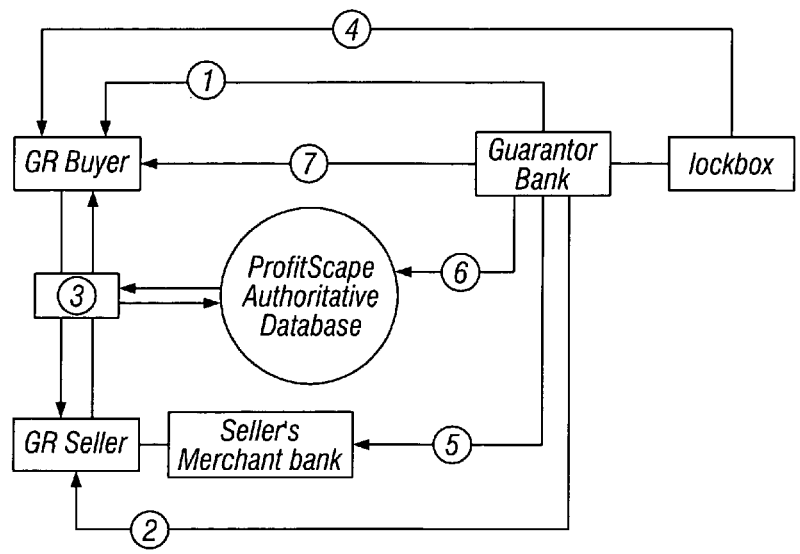
FIG. 24 is a flow diagram of a preferred lockbox of the invention.
Figure 26:
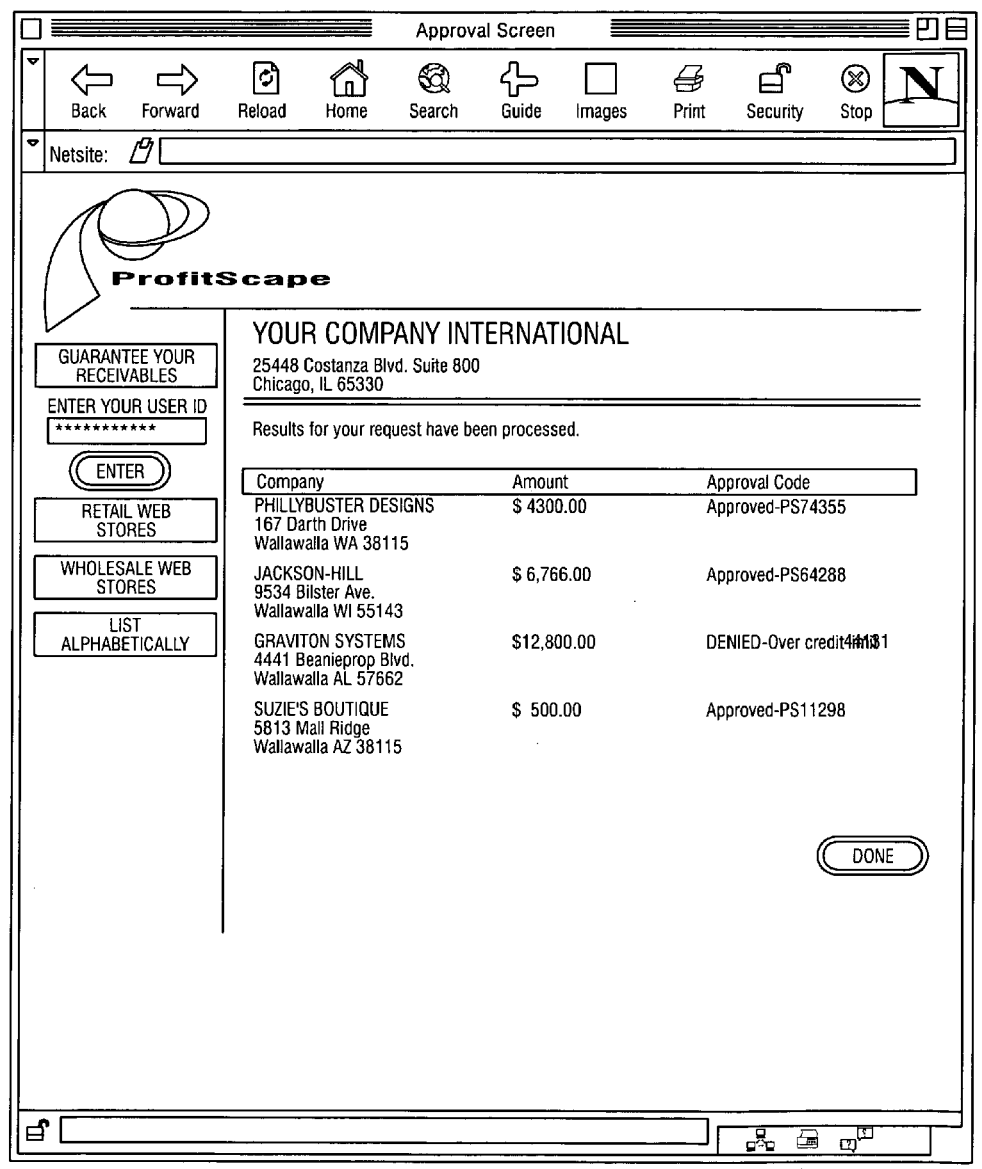
FIG. 26 is an illustrative approval screen in a web page according to the invention after submission.
Figure 27:
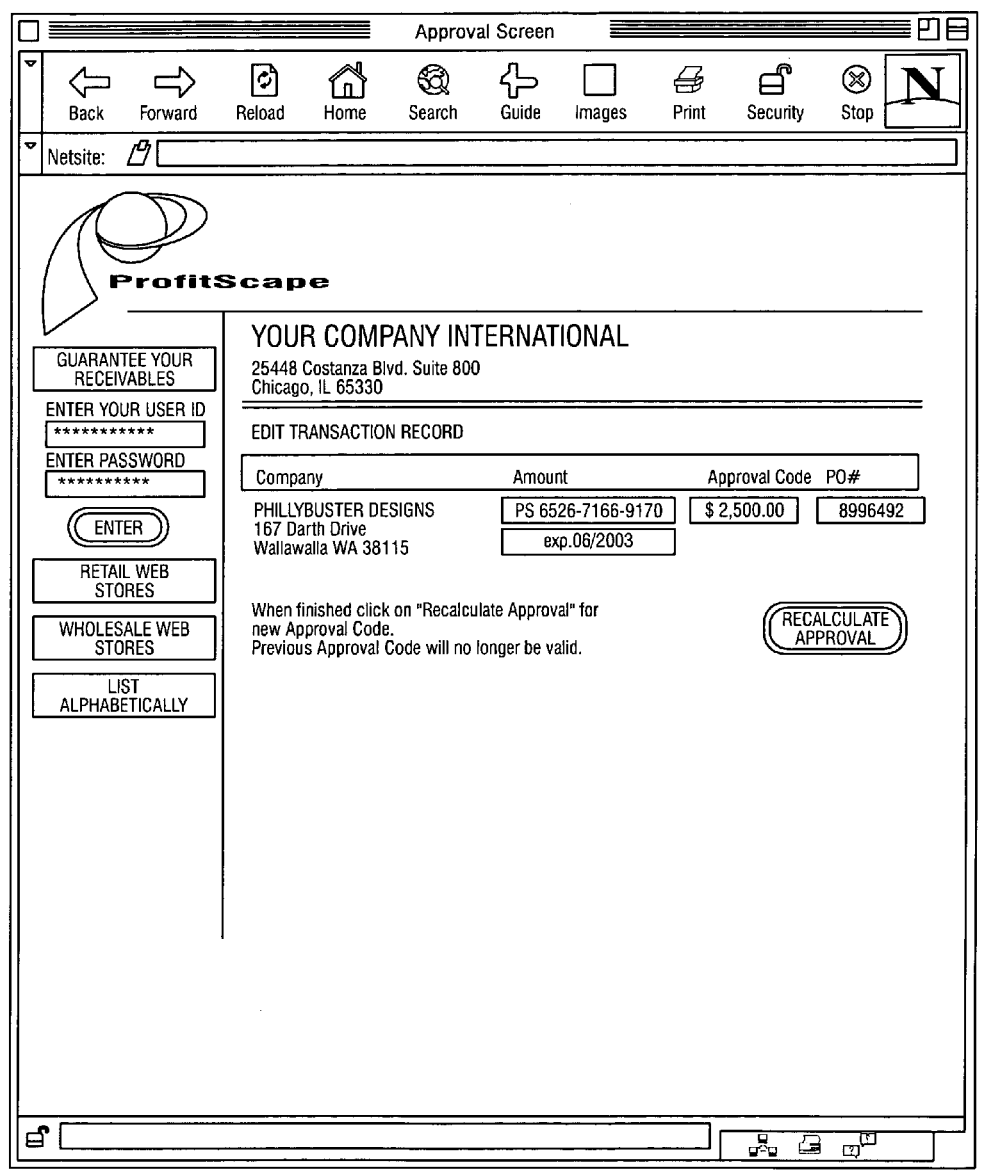
FIG. 27 is an illustrative edit screen.

FIG. 19 is a flow diagram of a fourth embodiment of the present invention. In this embodiment, the buyer selects the platform guaranteed receivables method as the method of payment 146. The e-commerce backend forwards purchase information to a processor 148. The processor forwards information to the guaranteed receivables issuer which is the platform of the present invention 150. Then the available credit is checked, new applicants are processed, and the profile database is updated accordingly 152. The buyer is notified of either approval or rejection of their application 154. If approved, the vendor, or seller, is notified to ship. The buyer makes payments to the guarantor bank lock box according to the terms set forth by the vendor, or seller 156. Next the database and credit limit are updated accordingly 158. Then the guarantor bank processes payment and forwards payment to the platform and merchant bank 160. Then the merchant bank credits the vendor 162.

FIGS. 20–28 further illustrate the invention as noted in the brief figure descriptions, above. The embodiments presented in the figures are not meant to limit the applications of the invention. The methodology of the present invention has application in buying and selling, as well as lending based upon accounts receivables, in addition to credit insuring purchases.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of electronic factoring, the method comprising providing an electronic platform for use by a plurality of buyers, vendors and at least one financial institution for factoring receivables, wherein the electronic platform is not administrated by the vendors;

receiving, in the electronic platform, application information that is provided directly from the buyers;

electronically assigning, in the electronic platform, each of the buyers a credit limit for factoring of receivables owed the vendor, said receivables being generated from the purchase of goods or services to the buyer from the vendor, wherein the credit limit indicates a transaction limit of the buyer for purchasing goods or services in exchange for said receivable to the vendor;

electronically receiving, in the electronic platform, transaction information that describes a transaction between one of the buyers and a vendor, wherein the transaction creates a receivable for the vendor, and wherein as part of the transaction the buyer is obligated to pay the vendor a payable;

electronically accessing the electronic platform for verification of credit availability for the transaction;

electronically sending the vendor a transaction authorization message; and electronically assigning, in the electronic platform, ownership of the receivable of the vendor to a financial institution.

2. The method of claim 1, additionally comprising:

issuing each buyer an identifying card showing membership on the platform;

purchasing from the vendor with the identifying card; and accessing the buyer's credit availability via the platform with information obtained from the identifying card.

3. The method of claim 1 further comprising:

verifying a buyer as a member of the platform; and purchasing from the vendor.

4. The method of claim 3 wherein the step of purchasing from the vendor comprises first searching the profile database with a search engine.

5. The method of claim 3 wherein the step of purchasing from the vendor comprises the steps of purchasing from the vendor with a line of credit within the credit limit established by the profile database.

6. The method of claim 5, additionally comprising:

making payment to the platform; and forwarding payment from the platform to the vendor.

7. The method of claim 5, additionally comprising making payment to the financial institution; and forwarding payment from the financial institution to the vendor.

8. The method of claim 5 wherein additionally comprising:

accessing the platform directly by the vendor for verification of credit availability; and forwarding payment to the vendor upon verification.

9. The method of claim 5, additionally comprising:

accessing the financial institution directly by the vendor for verification of credit availability; and forwarding payment to the vendor upon verification.

10. The method of claim 5, additionally comprising:

accessing the platform for verification of credit availability;

paying the financial institution for purchase; and forwarding payment from the financial institution to the platform and merchant bank so that the merchant bank can credit the vendor.

11. The method of claim 1 further comprising maintaining credit records on the platform; and periodically reviewing credit records by the financial institution for buyer credit availability.

12. The method of claim 1, additionally comprising:

creating offers by the vendor;

sending the offers to an offer database on the platform for storage;

comparing the offer database with a profile database; and creating a list of matching offers.

* * * * *